(No Model.) 13 Sheets—Sheet 1.

W. R. JOHNS.
CASH REGISTER AND INDICATOR.

No. 473,555. Patented Apr. 26, 1892.

Witnesses.
Fred'k J. Raulett
Lauritz W. Möller

Inventor.
Will R. Johns.
by W. A. Copeland
his atty (No Model.)

W. R. JOHNS.
CASH REGISTER AND INDICATOR.

No. 473,555.

13 Sheets—Sheet 2.

Patented Apr. 26, 1892.

Witnesses.
Fred'k J. Rawlett
Lauritz H. Moller

Inventor
Will R. Johns
by H. A. Copeland.
his atty.

(No Model.) 13 Sheets—Sheet 3.
W. R. JOHNS.
CASH REGISTER AND INDICATOR.
No. 473,555. Patented Apr. 26, 1892.
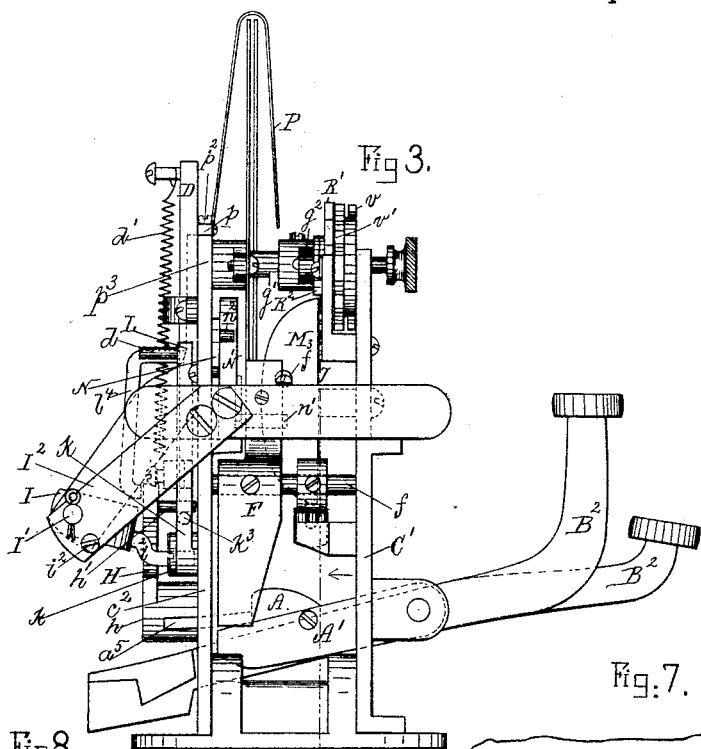
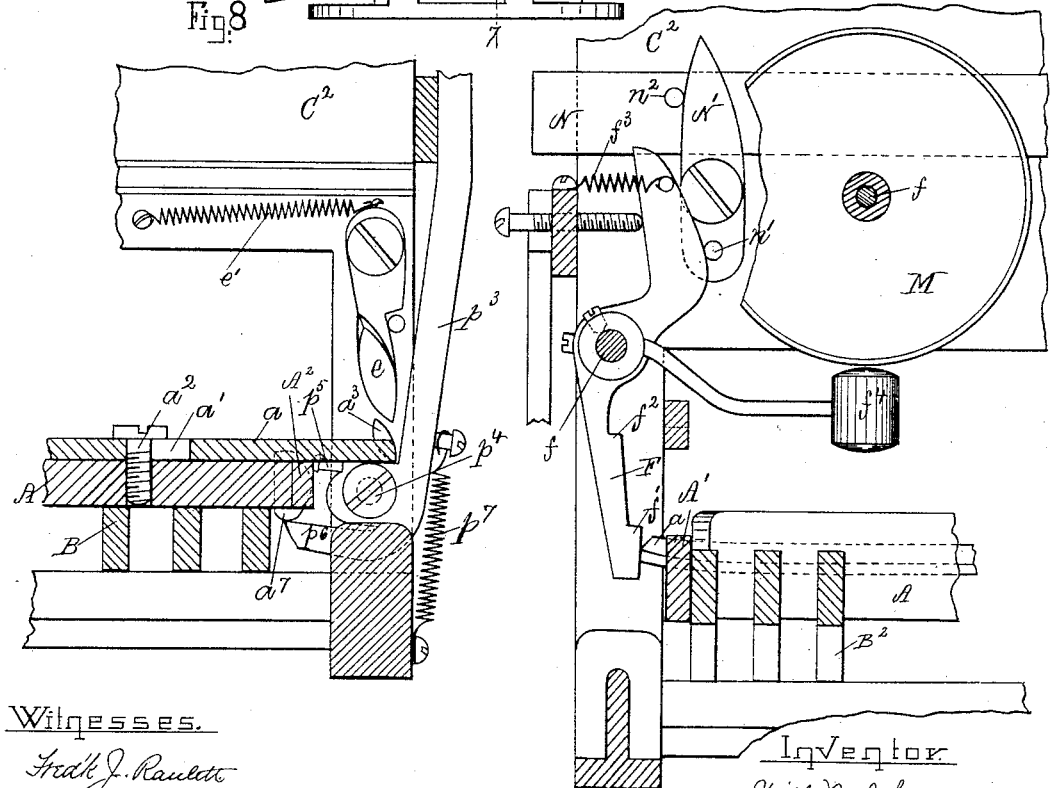
Witnesses.
Fred'k J. Raulett
Lauritz N. Miller
Inventor
Will R. Johns,
by W. C. Copeland,
his atty.

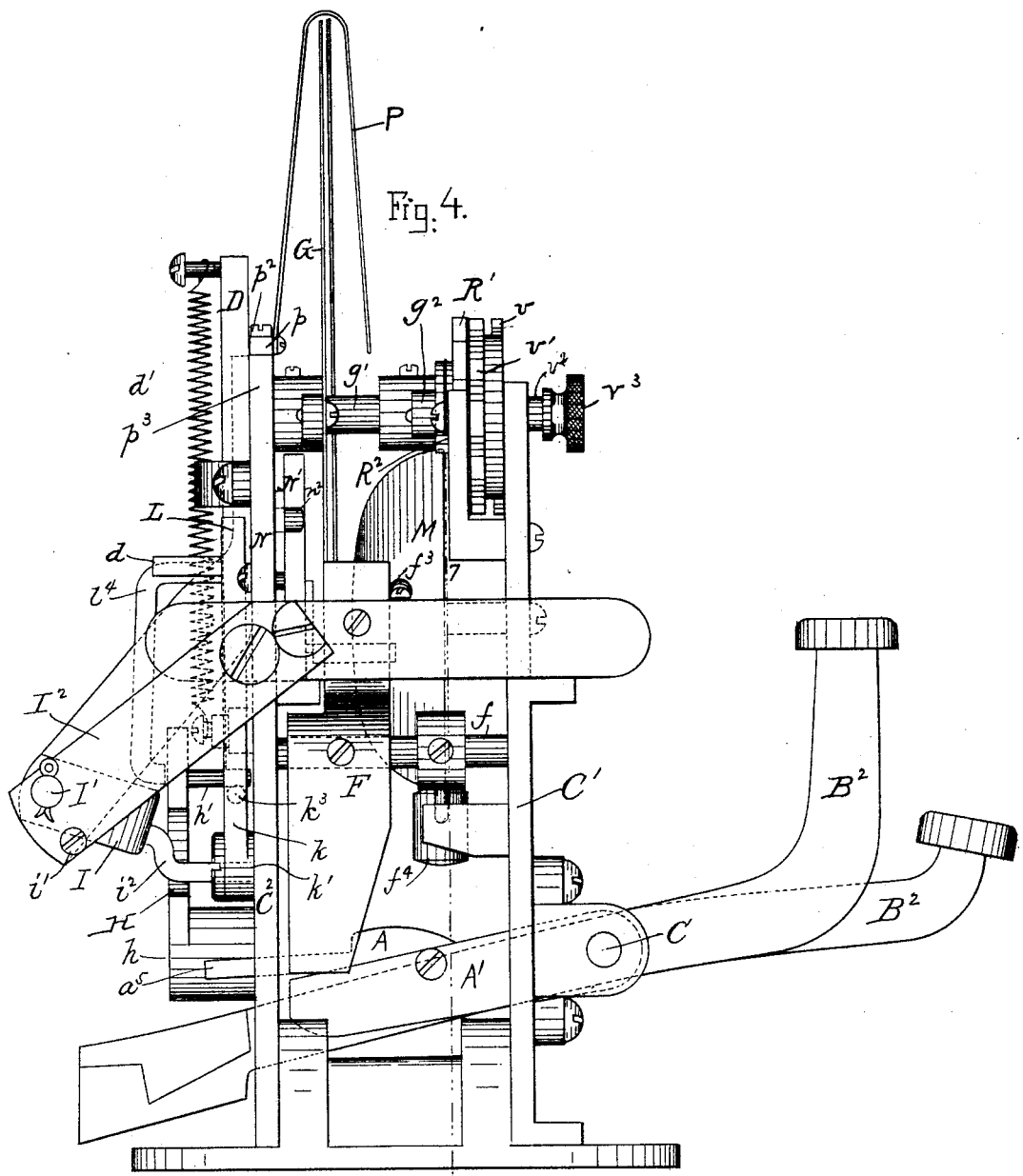

(No Model.)

13 Sheets—Sheet 5.

W. R. JOHNS.
CASH REGISTER AND INDICATOR.

No. 473,555. Patented Apr. 26, 1892.

Witnesses.
Lauritz N. Möller
Albert W. Mann

Inventor
Will R. Johns
by W. A. Copeland
his atty.

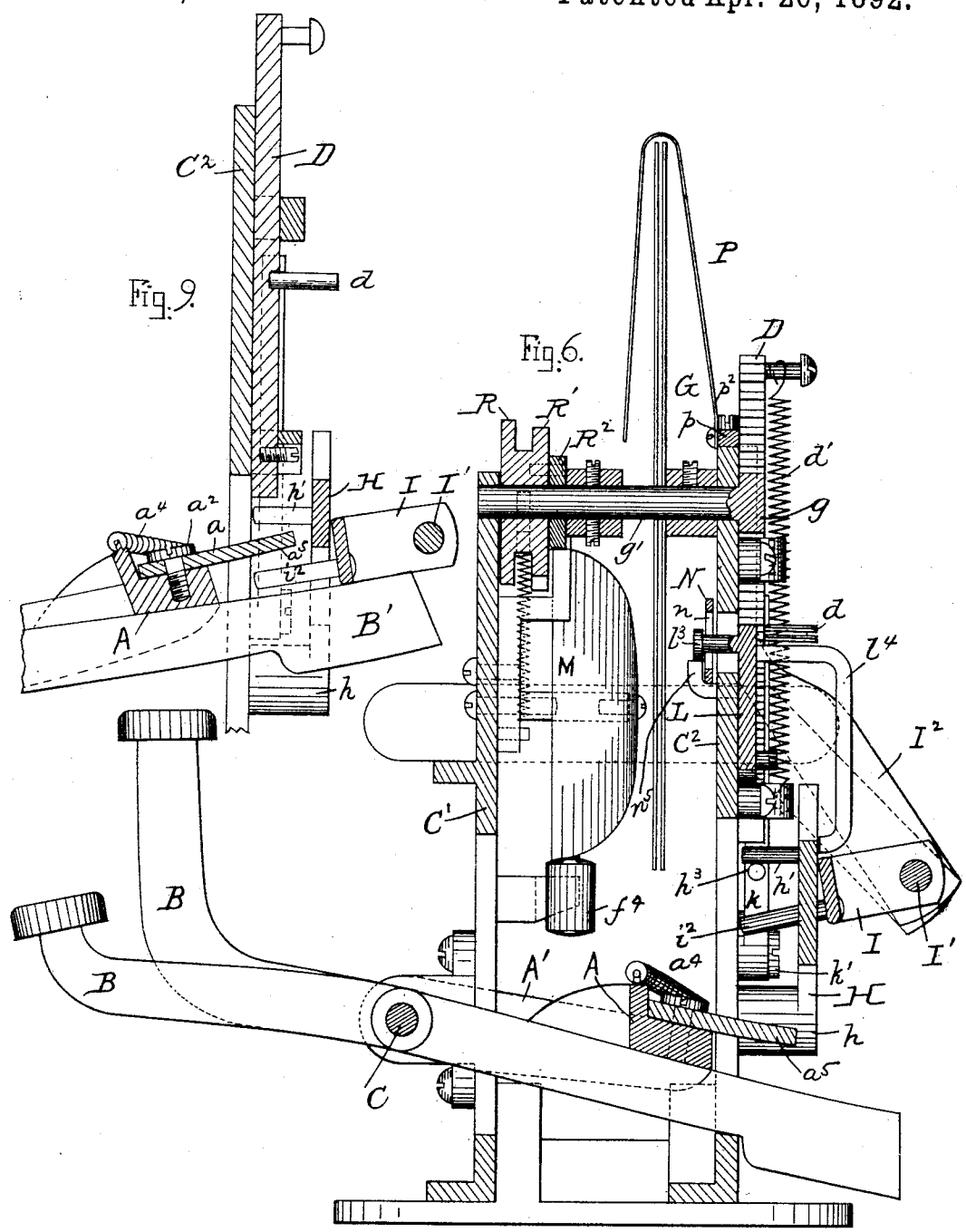

(No Model.) 13 Sheets—Sheet 7.
W. R. JOHNS.
CASH REGISTER AND INDICATOR.
No. 473,555. Patented Apr. 26, 1892.
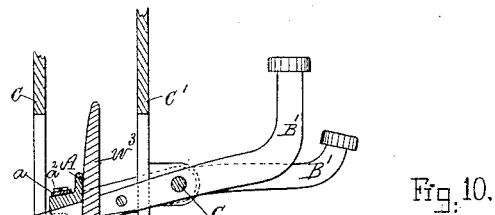
Fig. 10.
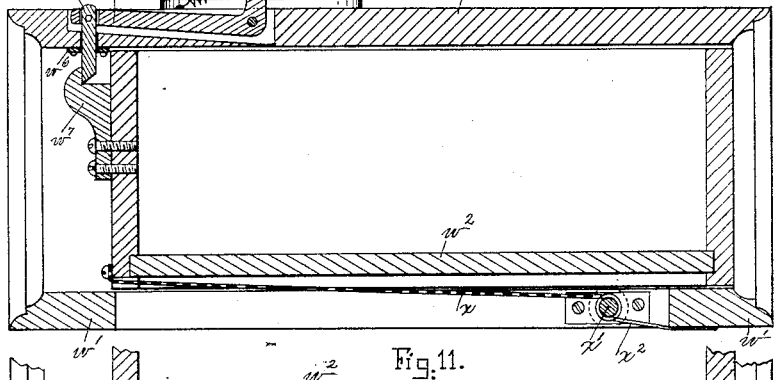
Fig. 11.
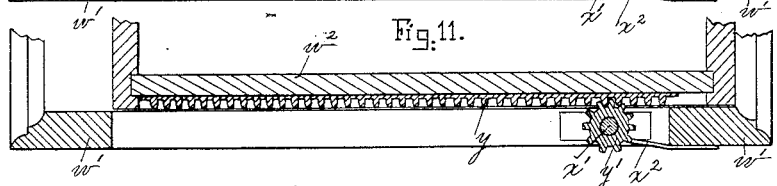
Fig. 12. Fig. 13.
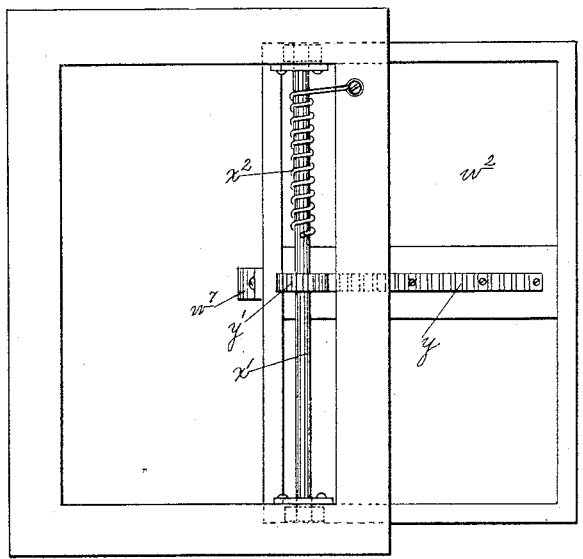
Witnesses.
Fredk J. Raulett
Lauritz N. Möller
Inventor.
Will R. Johns.
by W. A. Copeland,
his atty.

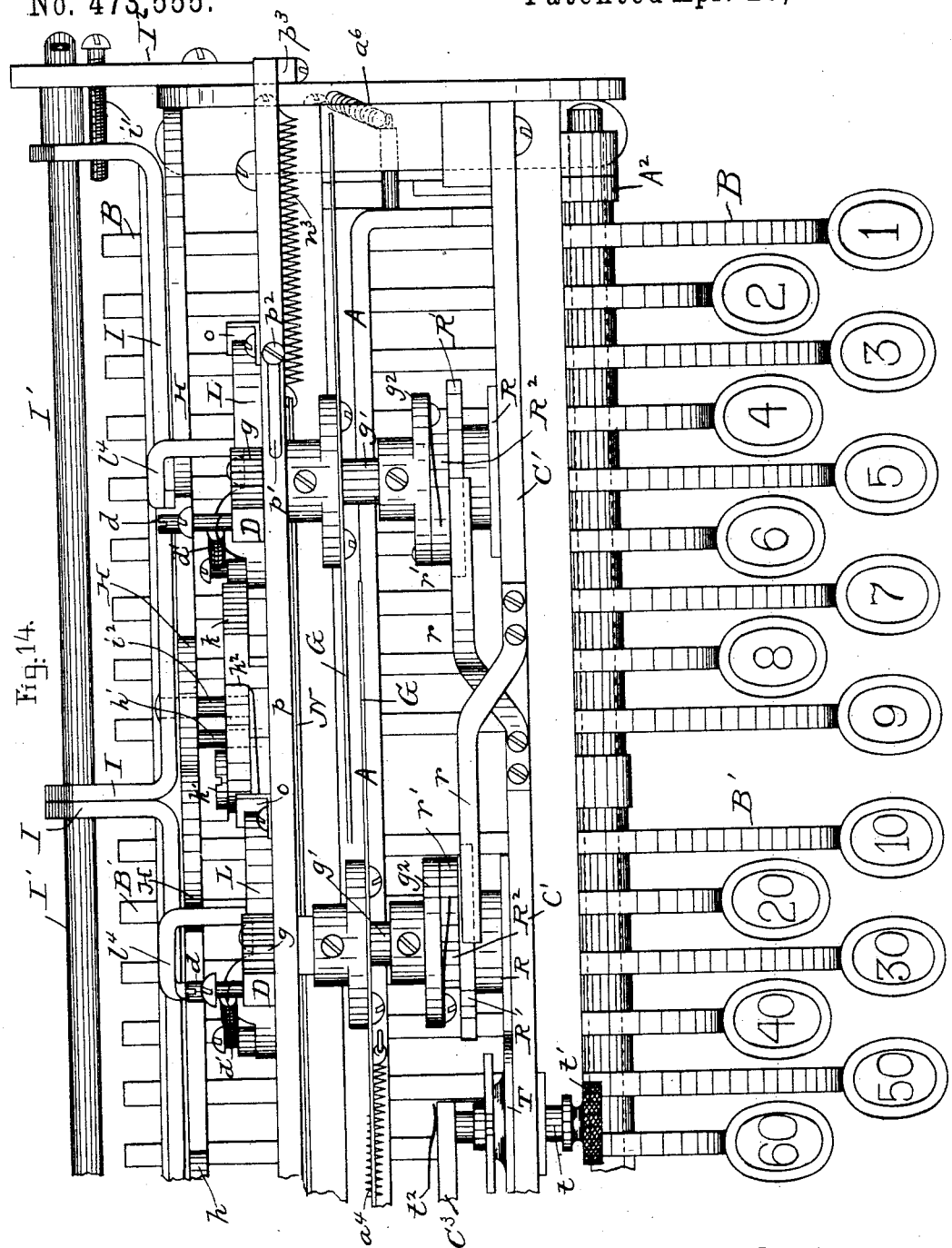

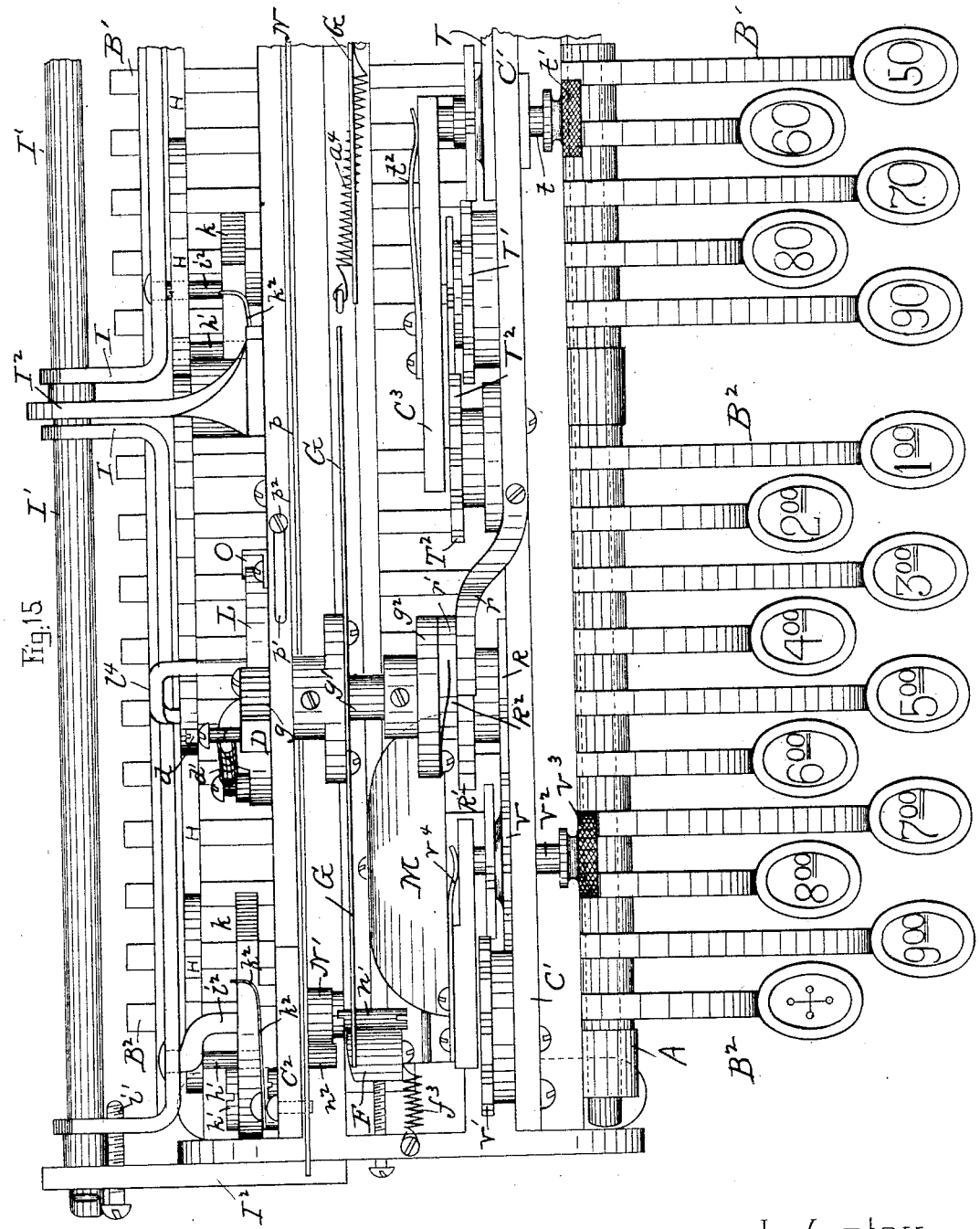

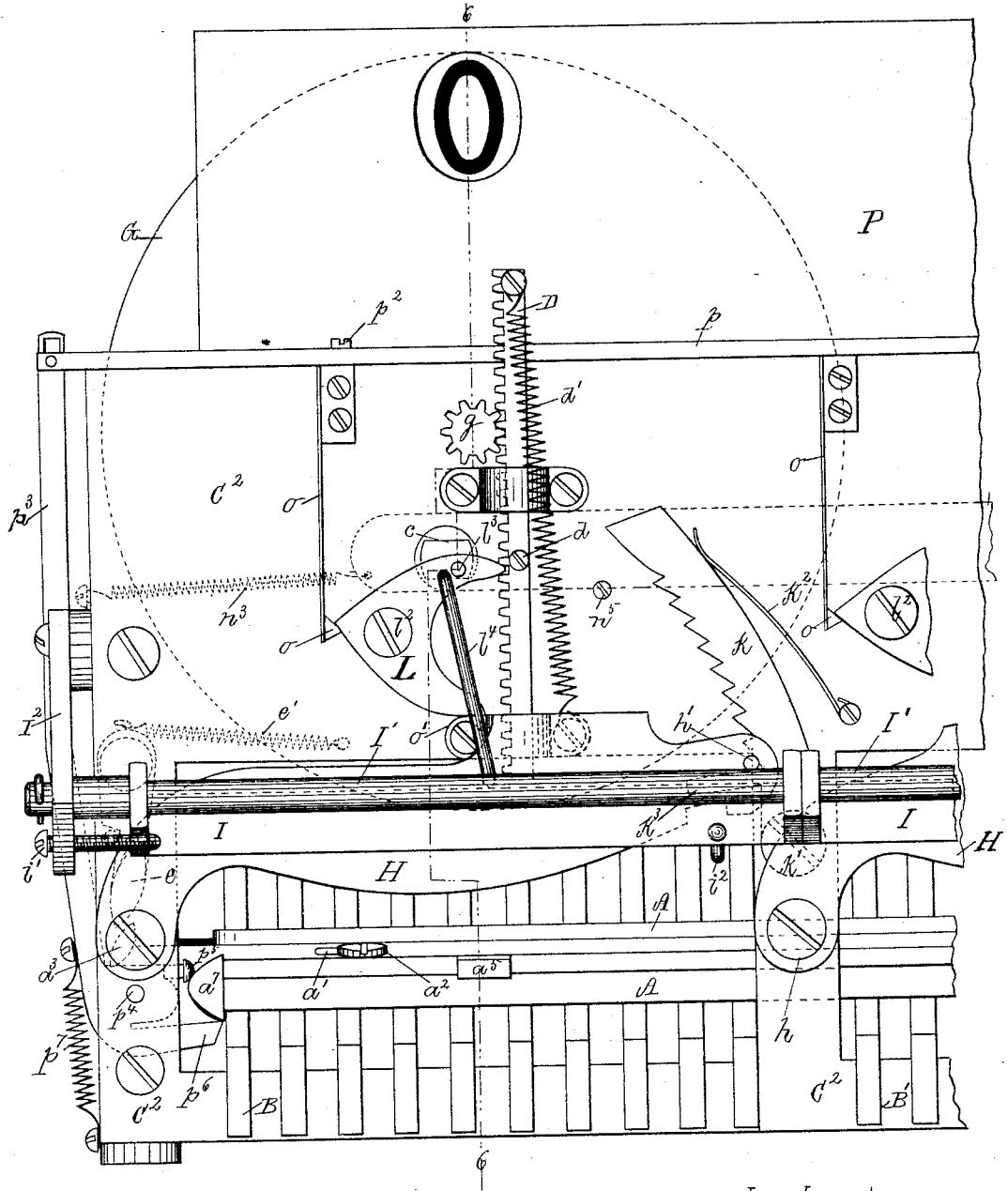

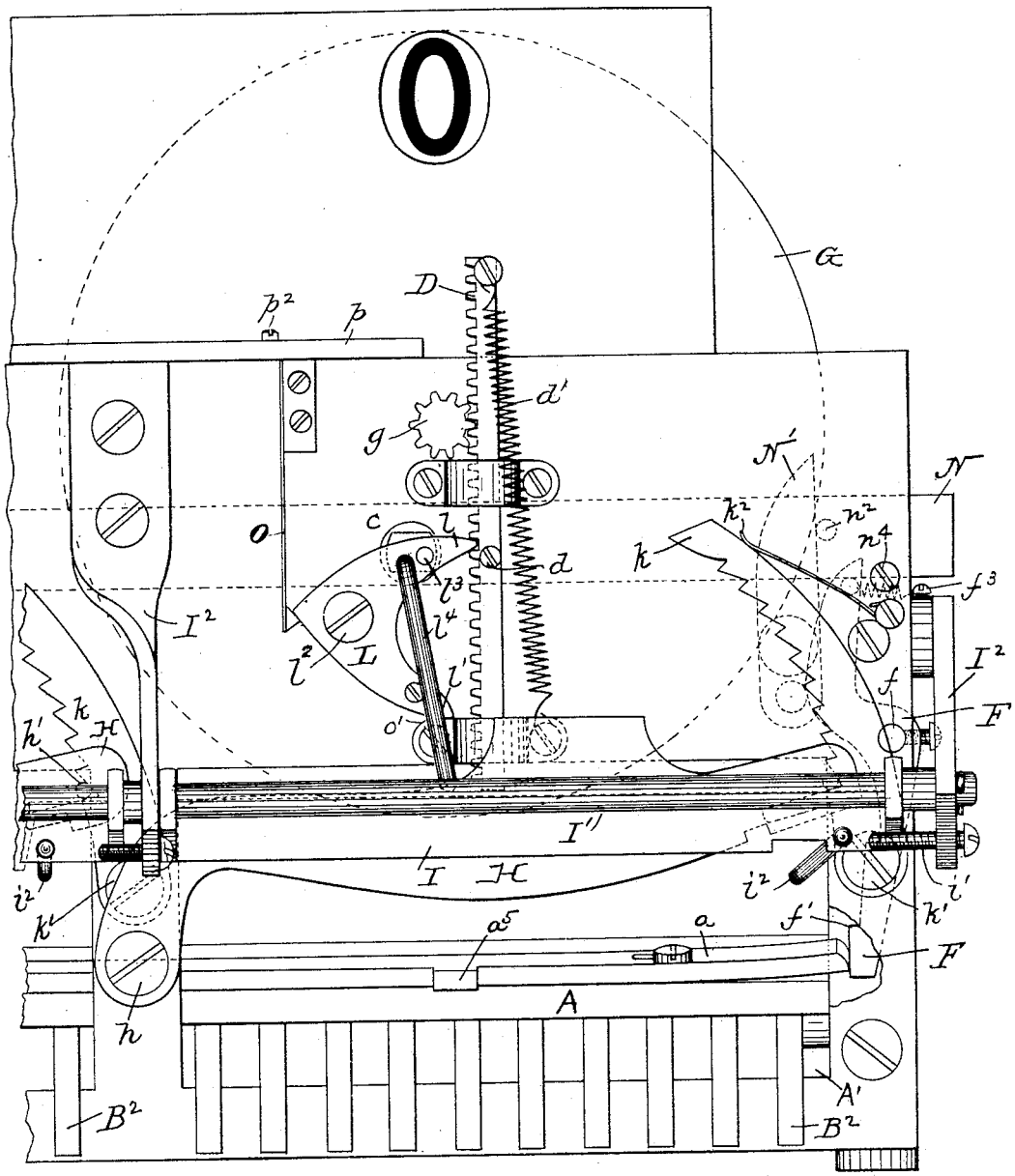

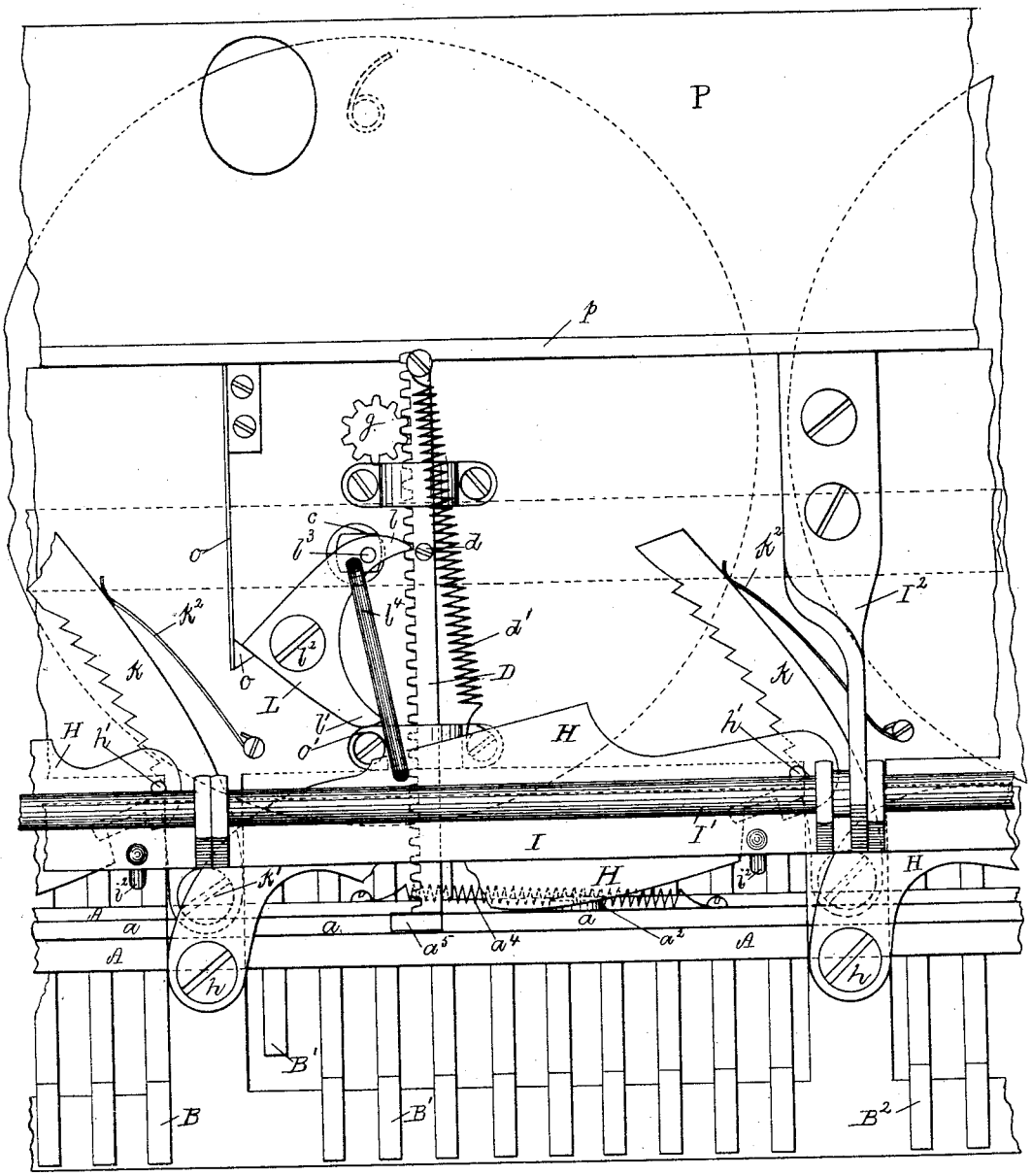

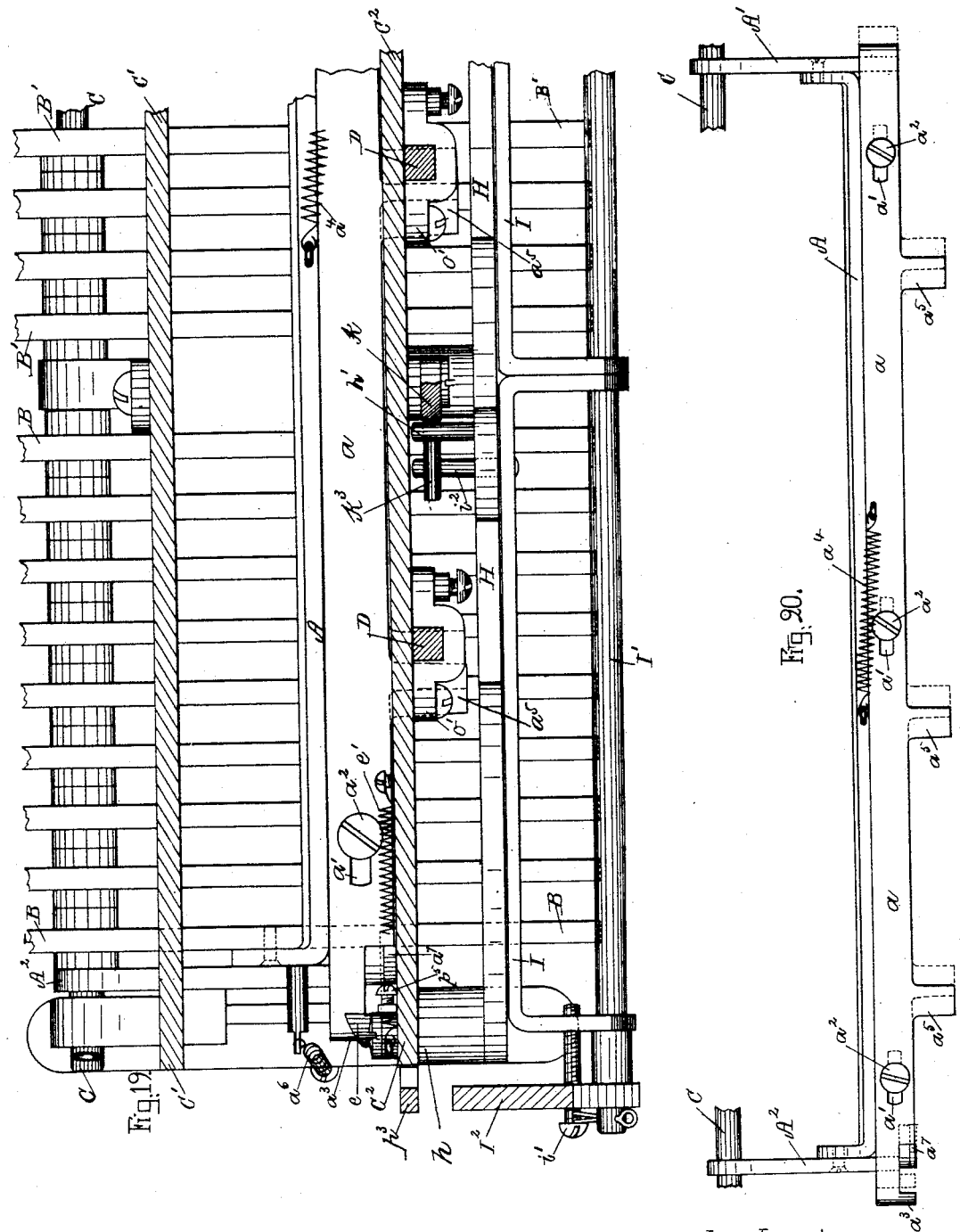

UNITED STATES PATENT OFFICE.

WILL R. JOHNS, OF BOSTON, MASSACHUSETTS, ASSIGNOR OF TWO-THIRDS TO PETER F. KEEGAN AND CHARLES H. LITTLE, OF SAME PLACE.

CASH REGISTER AND INDICATOR.

SPECIFICATION forming part of Letters Patent No. 473,555, dated April 26, 1892.

Application filed April 27, 1891. Serial No. 390,575. (No model.)

*To all whom it may concern:*

Be it known that I, WILL R. JOHNS, a subject of the Queen of Great Britain, residing at Boston, in the county of Suffolk and State of Massachusetts, have invented a new and useful Improvement in Cash Indicators and Registers, of which the following is a specification, reference being had to the accompanying drawings, which form a part hereof.

My invention relates to cash indicators and registers; and it consists in the devices and combinations hereinafter described.

Figure 1:
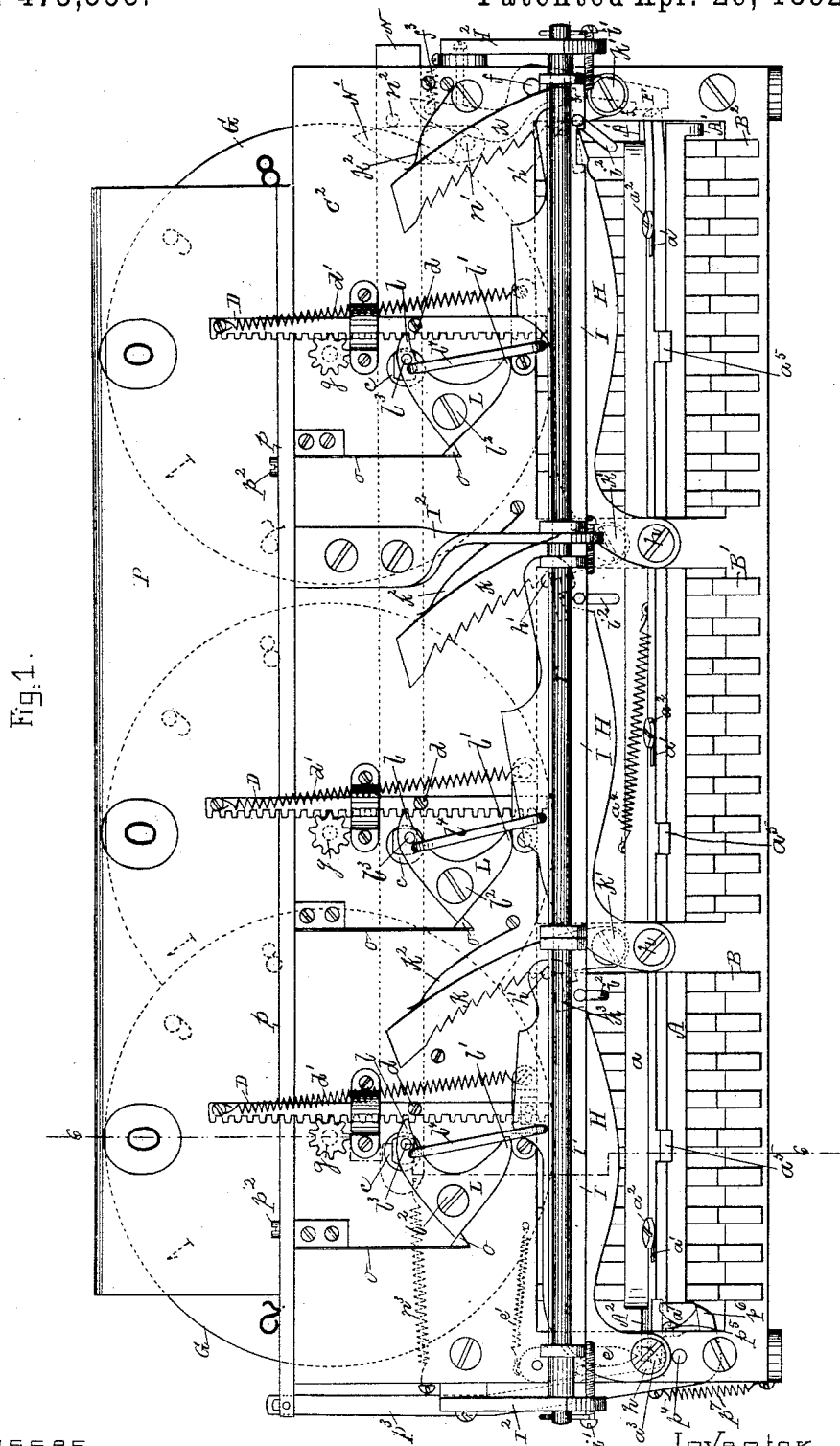
Figure 2:
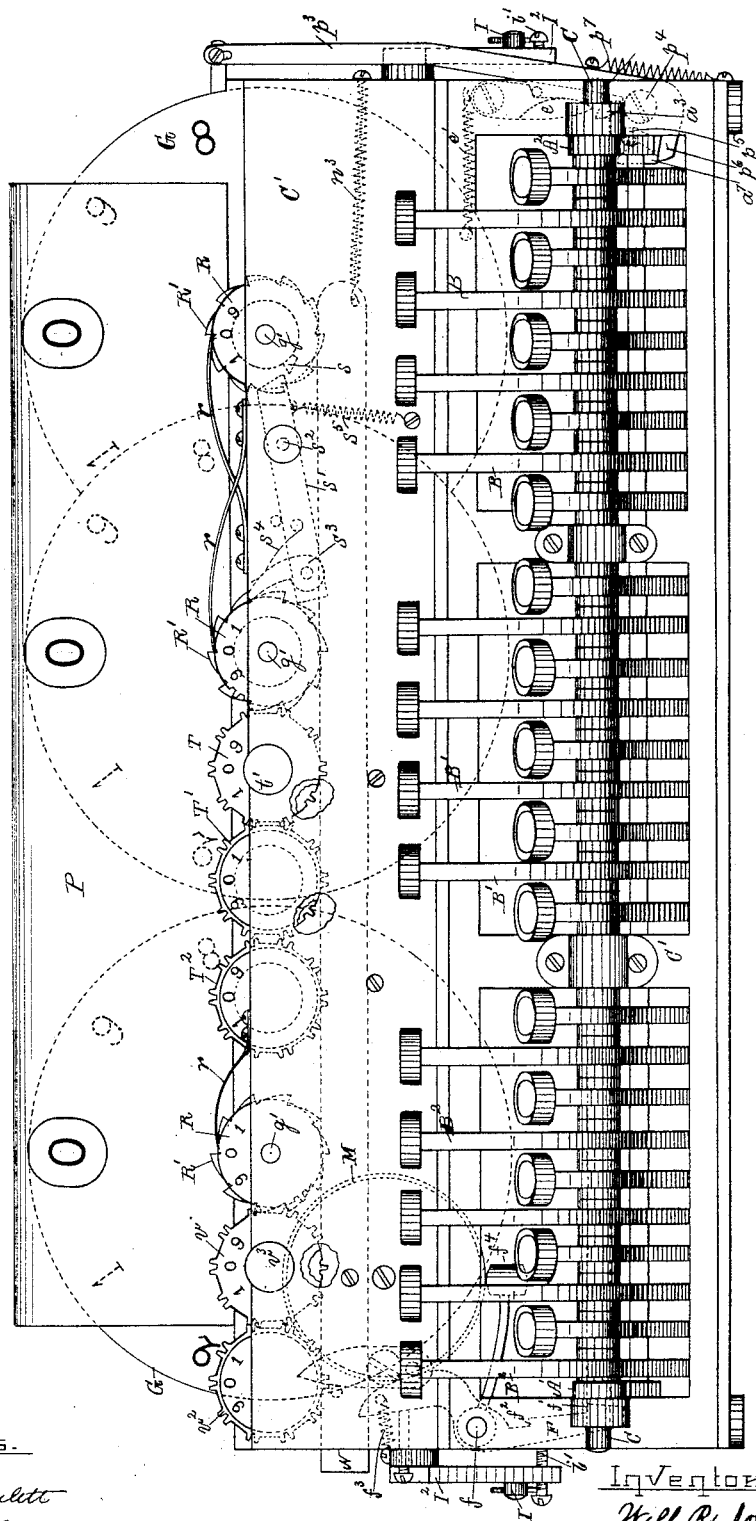
Figure 5:
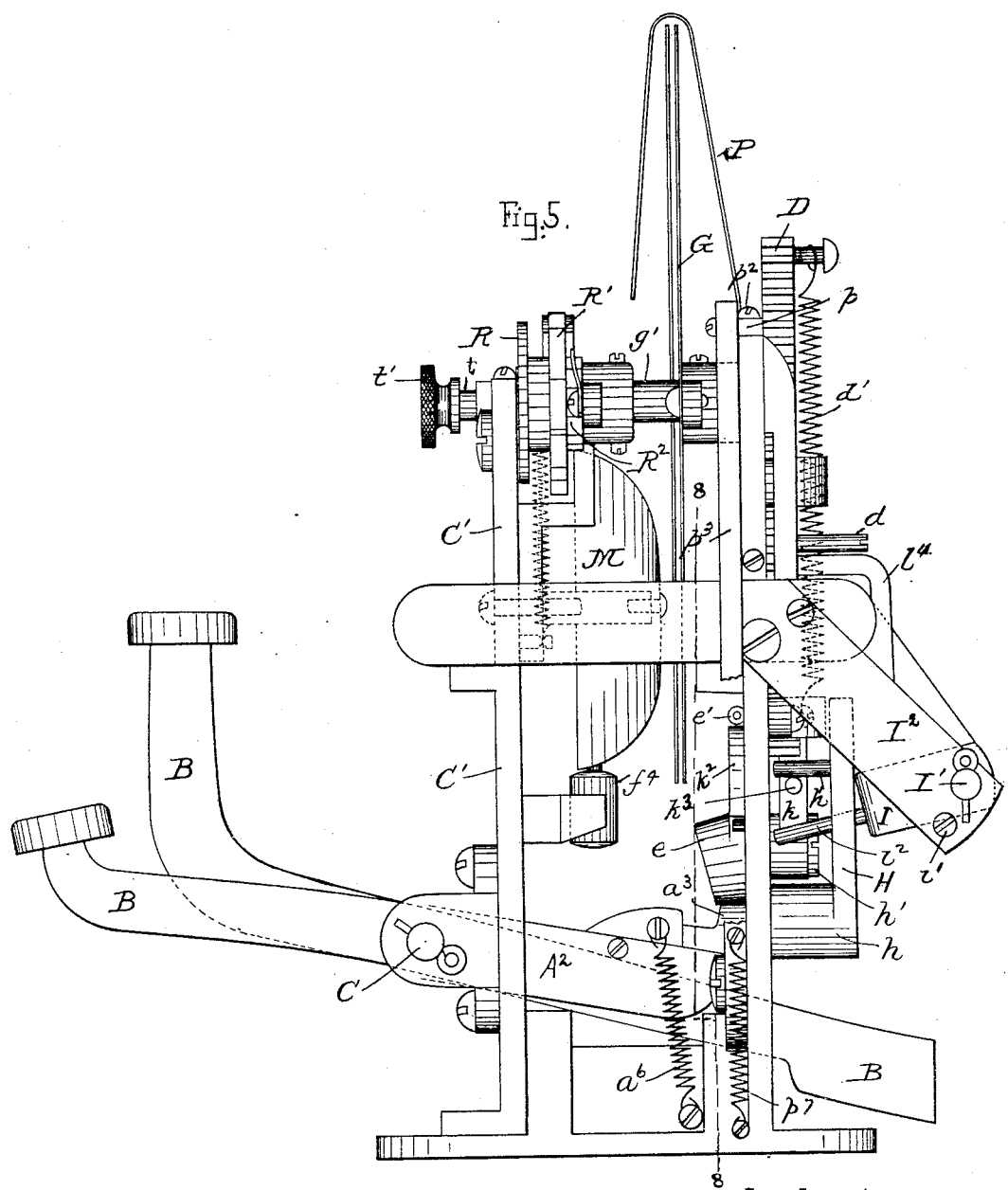

In the drawings, Figure 1 is a rear elevation of a machine embodying my invention, the case and drawer not being shown; and Fig. 2 is a front elevation of the same. Fig. 3 is a left-hand end elevation facing the front of the machine, and Fig. 4 is an enlargement of Fig. 3. Fig. 5 is a right-hand end elevation. Fig. 6 is a vertical section on line 6 6 of Fig. 1. Fig. 7 is a sectional view on line 7 7 of Fig. 4. Fig. 8 is a sectional view on line 8 8 of Fig. 5, showing the device for operating the sliding bar. Fig. 9 is a vertical section through one of the rack-bars. Fig. 10 is a sectional view of the drawer and so much as is necessary to illustrate the operation of the locking device. Fig. 11 is a modification of Fig. 10. Fig. 12 is a bottom plan view of Fig. 10. Fig. 13 is a bottom plan view of Fig. 11. Figs. 14 and 15 are plan views. Figs. 16 and 17 are rear elevations enlarged from Fig. 1. The above figures are all taken with the indicators set at zero. Fig. 18 is a rear elevation of the dimes set, showing the rack being raised during the operation of the first dimes-key. Fig. 19 is a horizontal section on line 19 19 of Fig. 16. Fig. 20 is a detail plan view of the sliding bar and cam from above.

The machine shown in the drawings as illustrating my invention is a three-bank machine, the right-hand bank or set of keys as the operator faces the machine being for cents, the second bank for dimes, and the third bank for dollars. When the "right-hand end" is referred to hereinafter, it is meant the right hand of the operator facing the machine. Each set has an indicator consisting of a disk having numbers from "0" to "9," the shaft for the cents-disk having a registering-wheel mounted thereon, which registers from "0" to "9," the tens being transferred to the first dimes-registering wheel. The dimes-bank has a train of transfer-wheels, and the dollars-bank has also a train of transfer-wheels which are independent of the dimes transfer system. These registering-wheels will be more particularly described hereinafter. The key-levers B B' B² are all fulcrumed on a common rod C, mounted in a bracket on frame C'. (See Figs. 6, 14, and 15.)

The rocking frame consists of a cross-bar A, resting on the upper side of the key-levers B B' B² and having forwardly-extending arms A' A², pivoted to the same rod C on which the key-levers are fulcrumed. (See Figs. 4, 6, and 20.)

Carried on the upper side of the rocking-frame bar A is a sliding bar $a$, having elongated slots $a'$ and guide-pins $a^2$ projecting through the slots, which limit the sliding movement. (See Figs. 8, 19, and 20.) The right-hand end of the sliding bar $a$ terminates in a cam-shaped projection $a^3$, which, when a key is depressed and the sliding bar $a$ is raised by the upward movement of the rocking frame, moves upward, bearing on the inner side of the pendent spring-controlled cam $e$, said cam $e$ being so adjusted that the sliding bar $a$ is caused to slide toward the left as it moves upward, distending the spring $a^4$, bringing the rear projections $a^5$ in line with the rack-bars D, so that the continued elevation of the sliding bar $a$ will raise each of the rack-bars to its full height. (See Figs. 8, 18, 19, and 20.) The cam $a^3$ having risen above cam $e$, the spring $a^4$, which has been distended, contracts and throws back the sliding bar to its first relative position on the rocking frame A, throwing the cam $a^3$ on the outside of the cam $e$ in the downward movement, cam $e$ being pivoted so as to yield a little as the cam $a^3$ descends, spring $e'$ returning the cam $e$ to its normal position as soon as cam $a^3$ has finished its descent, bringing cam $a^3$ again on the inside line of the cam $e$, as at the outset. The downward movement of the rocking frame is facilitated by the spring $a^6$, although gravity would carry it down without assistance, Fig. 5.

Fixed on the shaft $f$, which is journaled in the parallel plates C' C² of the frame at the left-hand side, is a ratchet-lever F, having ratchet-teeth or steps $f'$ $f^2$, with inclined faces or rises between the steps, against which the end of the sliding bar $a$ butts. (See Figs. 4 and 7.) As the sliding bar $a$ rises and slides toward the left, its end rides up on the inclined face of lever F, pushing the lower arm of lever F outward and rotating the shaft $f$ until the sliding bar reaches the first step $f'$, when the spring $f^3$, which has been distended by the outward thrust of the lower arm of lever F, is allowed to contract and throws the step $f'$ under the end of the sliding bar $a$, thus supporting the rocking frame and preventing its descent, even if the pressure on the key is released. The finger may be removed now from the key, if desired, and there will be no retrograde or forward movement of any of the parts. The key-levers may all be freely tilted up and down on their fulcrum so far as the raised position of the rocking frame will allow without affecting the mechanism in any way. The stroke may be completed by the continued depression of the same key with which the operation was begun or by the depression of any other key, and the registration will be governed by the last key operated. Thus if the operator by mistake first strikes the wrong key and discover his mistake before completion of the stroke he can release the key and strike the proper one without registering the incorrect number. Now assuming the sliding bar to be resting on the step $f'$ and the depression of one of the keys to be continued, the rear projections $a^5$ on the sliding bar $a$ bear up under the racks D, raising each one its full height, which, engaging with the pinions $g$, fixed on the shaft $g'$, carrying the disks G, rotate the pinions, and therefore the disks G, backward, the numbers on the disks, which are from "0" to "9," being so arranged that when the rack is at its highest point all the disks will be at zero.

The graduated arms H are pivoted at $h$ and extend crosswise at some distance above the rear extensions of the key-levers. (See Figs. 5, 9, and 16.) When any one of the keys is depressed, the rear extension of its lever rises and in the course of its ascent strikes the graduated arm belonging to that set, turning it on its pivot and carrying up the free end of the graduated arm H, unless it has been left at a higher point by the previous operation of a lower-numbered key, as will be explained later on. The arm is so graduated that the depression of the lowest-numbered key in its own set will raise the arm to its highest position. At the moving end of the arm is a pin $h'$, which engages with the curved ratchet-bar $k$, pivoted at $k'$, being held in engagement by the spring $k^2$ on the back of the bar $k$. (See Figs. 5, 6, 16, and 18.) Each ratchet-bar has as many teeth as there are keys in the set. When the right-hand key—that is, No. 1 in the cents-bank, 10 in the dimes-bank, and 1.00 in the dollars-bank—is depressed, the graduated arm will be raised to its most elevated position and the pin $h'$ will slip up over the teeth of the ratchet and engage with the highest notch. If the left-hand key of a set is struck, the pin $h'$ is not carried above the bottom notch, and the operation of one of the intermediate keys will carry up the graduated arm to engage pin $h'$ in the corresponding intermediate notch, the left-hand key in the dollars-bank being the tenth key, which is an extra or "change" key, as hereinafter described. If at the beginning of the operation of a key the graduated arm is already up and the pin $h'$ is engaged in a notch above that corresponding to the key being operated by reason of the previous operation of a lower-numbered key, the pin will remain in the same notch until thrown out, as hereinafter described.

For each bank of keys there is at the rear of the graduated arm H a rocking bar I, fulcrumed on the rod I', fixed in the bracket-arms I², Figs. 5, 14, 15, and 19. A pin $i'$ forms a rest to prevent the bar I from swinging farther down; but it is free to swing up. A pin $i^2$ projects from the bar I forward under the pin $k^3$, projecting from the ratchet-bar $k$. The adjustment is such that each key-lever as it rises will, before completing its full upward stroke, bear up against the rocking bar I, turning it upward on its fulcrum-rod, and when the key-lever is about at its highest point the pin $i^2$ on the rocking bar I will strike the pin $k^3$ on the ratchet-bar $k$ and turn the ratchet-bar slightly backward on its pivot, disengaging the pin $h'$ from the ratchet in whatever notch it may have been engaged. If the key being operated is of a number corresponding to a notch in the ratchet-bar $k$ lower down than the notch in which the pin $h'$ has been resting, the graduated arm H will not be reached by the key-lever in its ascent; but upon disengagement of pin $h'$ will drop until it strikes the top of the key-lever being operated, and as the pressure on the key is removed, allowing the key-lever and the rocking bar I to drop, the spring $k^2$ on the back of the ratchet-bar will cause it to immediately engage with the pin $h'$ at the notch corresponding with the number of the key operated. If the notch engaged be the lowest one, the pin $k^3$ will serve as additional guard to prevent further descent; but the main purpose of pin $k^3$ is to aid in the tripping already described. In the meantime the escapement-pawl L, whose upper tooth $l$ has locked the rack-bar D against any return movement during its upward stroke, allows the rack to escape and drop until the stop-pin $d$ strikes upon the upper edge of the graduated arm H, Figs. 16, 17, and 18. As the rack descends it rotates the pinion $g$ and the disk G of the bank, to which the operated key belongs, the other racks and disks remaining as they were—namely, the racks at their highest position and the disks at zero. As the graduated arm is limited in its descent according to the key operated, as above described, so the descent of the rack-bar is limited, and consequently the rotation of the disk. If, for instance, the No. 1 cents-key is operated, the graduated arm is caught at the upper notch of the ratchet-bar $k$, the rack-bar descends one notch, the pinion $g$, which has ten teeth corresponding with the ten divisions of the disk, moves one notch, and the disk moves forward one-tenth of a rotation, leaving the "1" in the position just occupied by the "0." A spring $d'$ facilitates the descent of the rack-bar. In the meantime, also, during the upward movement of the other parts described, the sliding bar $a$ has continued its ascent, together with the rocking frame A, and rides up on the next rise of the lower arm of lever F after leaving the step $f'$, still turning the shaft $f$, and carrying down the bell-hammer $f^4$ until the step $f^2$ is reached, when the spring $f^3$ again contracts, pulling back the lever F and rotating the shaft $f$ and carrying up the bell-hammer $f^4$. The step $f^2$ is deeper than step $f'$ and allows the rotation of the shaft sufficiently to throw the hammer $f^4$ against the bell M, Fig. 7.

The escapement-pawl L, already alluded to, is pivoted at $l^2$. A horizontal sliding bar N extends lengthwise of the rear plate $C^2$ of the frame along its inner or front face, supported on studs $n^4$ $n^5$ and having slots $n$ in line with the openings $c$ in the plate $C^2$, Figs. 4, 6, 16, 17, and 18. Studs $l^3$ project from the upper tooth $l$ of the escapement-pawl L through the slots $n$. Near the left-hand end of the sliding bar N there is a pendent lever N', pivoted to the inner face of the plate $C^2$, having a stud $n'$ projecting inwardly from its lower arm and bearing against the inner face of the upper arm of the lever F, Fig. 7. The sliding bar N has a stud $n^2$ bearing against the outside edge of the upper arm of pendent lever N', so that when the lower arm of lever F is pushed outward and the upper arm of lever F moves inward, bearing against stud $n'$, the pendent lever N' is turned on its pivot, so that its upper arm moves outward against stud $n^2$, and thus moves sliding bar N outward. The effect of this is that the edge of the slot $n$ pushes against the stud $l^3$ and causes it to sweep forward, turning the escapement-pawl on its pivot, and thereby causing the upper tooth $l$ of the escapement-pawl to engage with the rack-bar D and keeping the lower tooth $l'$ out of engagement. The slots $c$ and $n$ must necessarily be large enough to allow the stud $l^3$ to sweep in an arc corresponding to the arc of movement of the tooth $l$. Spring-catch $o$ is on the under side of the rear projection of the escapement-pawl and keeps tooth $l$ in engagement with the rack. The face of catch $o$ is slightly inclined and its spring yields sufficiently to allow the rack to slip up past the tooth $l$; but the tooth $l$ cannot swing far enough down on its pivot to become disengaged in that direction, and thus it prevents descent of the rack until the pawl is tripped at the end of the upward movement. When the key is fully depressed and the sliding bar $a$ has reached the step $f^2$, allowing the return of the lever F to its first position, as already described, the movement of the pendent lever N' is reversed and the sliding bar N is allowed to return, being brought back by spring $n^3$, Fig. 16. The arm $l^4$ projects from the tooth $l$ to the rear and downward, Figs. 1, 6, 16, 17, and 18. This is so adjusted as to be struck by the swinging bar I at the proper time in the ascent, thereby tripping tooth $l$ out of engagement and swinging the rear projection of the escapement-pawl down on the under side of the spring-catch $o$, which the inclined face of the catch permits, and swinging stud $l^3$ back to the other side of slots $c$ and $n$. This brings tooth $l'$ into engagement, which allows the rack to slip down over the tooth and prevents any upward movement of it until the full descent. The change back from engagement of tooth $l'$ with the rack to tooth $l$ is accomplished by sliding bar N, as previously described.

The blind P is attached to the sliding bar $p$, which is formed with guide-slots $p'$, through which the guide-pins $p^2$ project, Figs. 5, 6, 14, 15, and 16. The right-hand end of this sliding bar is linked to an upright arm $p^3$ of a bell-crank lever pivoted at $p^4$, Figs. 8 and 16. Near the lower end of this upright arm $p^3$ is a stud $p^5$, against which a cam $a^7$ on the end of rocking frame A operates, Figs. 8, 16, and 19. As frame A rises, this cam $h^7$, bearing against stud $p^5$, throws upright arm $p^7$ outward, drawing the blind in that direction, which thus covers the place occupied by the reading-openings at the conclusion of the operation, Fig. 18. When the rocking frame descends, the cam $a^7$ bears down upon the horizontal short arm $p^6$ of the bell-crank lever, turning it on its pivot and returning the blind to its first position to expose at the reading-opening the proper number now indicated by the disk. A spring $p^7$ helps the movement, or may do the work without the cam at all, Fig. 8. The object of having the blind slide is to prevent the exposure of any number on the disk at the reading-opening until the full operation of the key, so that the observer will not be misled by reading the wrong number while the disk is rotating before completion of the operation.

The same shafts $g'$, on which the disks G are fixed, have each journaled thereon a registering-wheel R, having fixed to its rear face a ratchet-wheel R', Figs. 2, 6, 14, and 15. A flat spring $r$, secured at one end to the frame, operates as a detent, allowing rotation of the wheel in one direction only. It is so arranged that the cents-wheel rotates in the opposite direction from the dimes and dollars registering wheels for the purpose of allowing a transfer from the cents-wheel to the dimes-wheel on the negative movement, while the dimes-wheel registers for its own keys on the positive movement. If the transfer were made on the same movement as the registration for the operation of the dimes-key, there might be a failure to transfer when a key in both banks is operated at the same time, as will be described hereinafter. Fixed on the rear face of the wheels R' is another ratchet-wheel $R^2$, engaged by a spring-pawl $r'$, pivoted to an arm on the yoke $g^2$, pinned on the shaft $g'$, Figs. 14 and 15.

The wheels R R' $R^2$ are all fixed together, but are loose on the shaft $g'$. When the shaft $g'$ and disk G rotate in one direction, the pawl $r'$ rides backward over the tops of the teeth of ratchet-wheel $R^2$, and the detent-springs $r$, engaging with teeth of ratchet-wheel R', prevent any of the wheels R R' $R^2$ from turning. On the reverse movement of the shaft $g'$ and disk G the ratchet $r'$ engages with the teeth of ratchet $R^2$ and causes the wheels R R' $R^2$ to rotate with the shaft, the detent-springs $r$ slipping over the tops of the teeth.

The ratchets of the cents-bank are arranged with their teeth inclining in the opposite direction from those of the dimes-bank, so that the cents-wheel will register during the positive movement and the dimes-wheel during the reverse movement. The reason for this is that the cents-wheel is so connected with the dimes-wheel that upon each rotation of the cents-wheel the amount shall be transferred to the dimes-wheel. If the cents-wheel and dimes-wheel registered on the same movement, when the operator strikes one of the dimes-keys and one of the cents-keys at the same time, as will frequently be the case, and if the cents-registering wheel comes around to zero or past during that movement, the transfer which should take place will be lost. To obviate this, I have arranged the wheels so that the cents-wheel registers on the positive movement the amount indicated on the disk after operation of the last preceding cents-key, and does not register the amount indicated by the key being operated. For illustration: If the No. 7 cents-key is operated, the rack rises first to its full height, engaged by the pinion-wheel in the tenth notch of the rack, counting from the top, and carrying the disk to zero. When the rack is released and allowed to descend, it drops seven notches, so that the pinion engages the rack at the third notch from the top, and the indicator shows "7." If now another key is operated, the rack is again carried to its full height into engagement with the tenth notch; but being already in engagement with the third notch it has to move only seven notches and the pinion-wheel also seven notches. The registering-wheel being made to register during this movement is also turned to register seven, which was the number of the last preceding key. As the operation of a key in any bank raises all the racks and brings all the disks to zero, if not already there, the operation of a dimes-key or a dollars-key immediately after the operation of a cents-key will cause registration of the amount indicated by the cents-disk, as well as if one of the cents-keys were operated, and in that case the next operation of a cents-key will merely indicate the number of that key without registering anything. To get the true reading, therefore, there should always be added to the amount shown by the registering-wheels the amount indicated on the cents-disk, unless that amount has already been registered by operation of one of the other keys, as just explained. There will be no confusion as to this, because if such subsequent registration has been effected the cents-disk will stand at zero.

The transfer device from the cents-wheel to the dimes-wheel is as follows: On what might be called the "hub" of the cents-registering wheel is a lug $s$, Fig. 2. A lever $s'$, pivoted to the plate C' at $s^2$, is set so that one end projects over the path of movement of the lug $s$. Pivoted to the other end of the lever $s'$ is a pawl $s^3$, which is held by spring $s^4$ in engagement with the ratchet-wheel R' of the dimes set. The lug $s$ is formed at such a point on the circumference of the hub that it bears up under lever $s'$ just after the "9" of the cents-registering wheel has passed the reading-opening and before reaching zero, turning the lever $s'$ on its pivot as the registering-wheel continues its rotation and carrying down the end of the lever on which the pawl is carried until the pawl engages with the next tooth in the dimes ratchet-wheel below that with which it was previously engaged, and then as the lug $s$ in its continued rotation escapes past the lever $s'$ the spring $s^5$ brings the lever $s'$ back to its first position, causing pawl $s^3$ to move ratchet-wheel R' of the dimes set one notch, and consequently the dimes-registering wheel will turn one point.

The dimes-wheel R is connected with a train of transfer-wheels T T' $T^2$, the method of transfer being too well known to require detail description. (See Figs. 2, 14, and 15.) The first transfer-wheel T is mounted on a shaft $t$, journaled in plates C' $C^3$, which is capable of a slight longitudinal motion, the outer end of the shaft having a button $t'$ and the inner end extending through the plate $C^3$ and bearing against the flat spring $t^2$, pinned to plate $C^3$. The adjustment is such that normally the single tooth of wheel R will engage with one of the teeth of wheel T at each revolution of wheel R; but by pressing the button $t'$ the shaft $t$ is pushed in, so as to throw the wheel T out of plane with wheel R, and while held in this position by means of the button the shaft may be turned in either direction to rotate the wheel T, which is still in gear with the wheels T' $T^2$, so that these wheels can all be rotated and set at "0" without operating the keys or moving wheel R. Spring $t^2$ will throw the shaft out again when the button is released. In the same way the transfer-wheels $v$ $v'$, connected with the dollars-bank, may be set, the sliding shaft being marked $v^2$, the button $v^3$, and the spring $v^4$.

The key at the outside end of the dollars-bank is what is called a "change-key." The lever connected with it raises the rocking frame in the same way as do the other keys, and thus raises all the racks and sets the indicators at zero; but the lever does not trip the pin $h'$ of the graduated arm from engagement with the ratchet-bar $k$. Consequently when the key is released and the rocking frame descends the racks are all kept at their highest point with indicators at zero, and the only movement of any of the registering-wheels is that of the cents-registering wheel to register the last amount indicated, provided a cents key was the last preceding one operated, as heretofore explained. This key is used when it is desired either to set all the indicators at zero or to open the drawer for purpose of making change or other purpose without registering.

The device for locking and unlocking the drawer is shown in Figs. 10 to 13. W and W' represent, respectively, the top and bottom of the drawer-case, and $W^2$ the cash-drawer. A bell-crank lever $W^3$ $W^4$ is fulcrumed in a slot in the top W of the drawer-case, the upright arm $W^3$ of the bell-crank extending up in front of the rocking frame A. The horizontal arm $W^4$ of the bell-crank has pivoted at its end a bolt $W^5$, which extends down through a guide-plate $W^6$ and engages with a catch $W^7$ at the back of the drawer and locks the drawer. When the key is operated, raising the rocking-frame bar A, the latter describes an arc of a circle as it rises and turns the bell-crank on its fulcrum, lifting the bolt $W^5$ out of engagement. A chain $x$ is secured at one end to the back of the drawer and at the other end to the shaft $x'$. A coil-spring $x^2$ is secured at one end to the shaft and at the other end to the frame, so that when the bolt is lifted and the spring throws open the drawer the chain is wound around the shaft.

The operation of closing the drawer unwinds the chain and winds up the spring, which tends to throw open the drawer, except that the bolt $W^5$ prevents. When a key is depressed, the rocking frame rises and turns the bell-crank on its fulcrum, lifting the bolt from its engagement with the catch $W^7$, and the spring $x^2$ throws the drawer open, winding up the chain $x$, as already described. When the drawer is closed again, the chain is unwound and the spring is wound up, as before. The beveled end of the bolt rides up on the inclined back of the catch $W^7$ and tilts the bell-crank on its fulcrum enough to allow the bolt to slip over into its notch.

In the modification shown in Figs. 11 a d 13 a rack $y$ and pinion $y'$ are substituted for the chains.

The operation of the machine is as follows: The indicators and registers are supposed to be set at zero, as shown in Figs. 1 and 2. The racks D are at their highest position engaged by the pinions $g$ in the tenth notch, counting from the top. If, for instance, it is desired to register nine cents, the No. 9 cents-key is depressed, raising the rear extension of the key-lever and carrying up the cross-bar A of the rocking frame and the sliding bar $a$, which rides on the cross-bar A. As the sliding bar $a$ rises, its cam $a^3$ bears against the inner side of the pendent cam $e$, causing the sliding bar $a$ to slide toward the left and bringing each of the rear projections $a^5$ in line with their several racks. The racks being, however, already at their highest position, the rocking frame and sliding bar will continue the ascent with the projections $a^5$ in line with the racks, but without coming in contact with the racks until the end of the upward movement. There is therefore no backward rotation of the indicator-disks at this time, nor is there any movement of the escapement-pawl. As soon as the rocking frame begins to rise the cam projection $a^7$ on the end of the rocking frame releases its pressure on the horizontal arm $p^6$ of the bell-crank connected with the blind, and the spring $p^7$ turns the bell-crank $p^3$ $p^6$ on its fulcrum and slides the blind, so as to carry the reading-openings out of line with the numbers on the indicator-disk. The cam $a^7$ as it rises acts on the stud $p^5$ and helps to push arm $p^3$ outward, both devices preferably being used, as they aid each other. As the pin $h'$ of the graduated arm H is already in engagement with the lowest notch of the ratchet-bar $k$, (the appropriate notch for the No. 9 key, there being nine notches in all,) the key-lever comes in contact with the graduated arm just at the end of its upward movement and lifts pin $h'$ slightly, but not enough to reach the next notch above. The key-lever also comes in contact with the rocking bar I and carries it up until the pin $i^2$, projecting from the bar I, strikes the pin $k^3$, projecting from the ratchet-bar $k$, and turns the ratchet-bar back on its pivot, disengaging pin $h'$. As soon, however, as the pressure on the key is released, allowing the key-lever to drop, the spring $k^2$ returns the ratchet-bar, and the pin $h'$ re-engages with the same notch. During the upward movement of the rocking frame the sliding bar $a$ has pushed the lower arm of pendent ratchet-lever F outward, turning the shaft $f$, and carrying down the bell-hammer $f^4$. While the lower arm of lever F was moving outward, the upper arm of lever F moved inward, bearing against stud $n'$ on pendent lever N', turning N' on its pivot, so that the upper arm of N', which bears against stud $n^2$ on the sliding bar N, pushed N outward. Just before the pin $h'$ is tripped the end of sliding bar $a$ reaches the second step $f^2$ of the lever F and the spring $f^3$ contracts, pulling back the lower arm of lever F, rotating the shaft $f$ and throwing up the bell-hammer against the bell M. The pressure of the upper arm of lever F being removed from stud $n'$ on lever N', the spring $n^3$ pulls sliding bar N back again. The upward movement of the rocking frame turns the bell-crank $W^3 W^4$ on its fulcrum and lifts the bolt from engagement with the drawer at about the time the bell is struck and the spring throws the drawer open. At about the same time that the rocking bar I trips the pin $h'$ from the ratchet-bar $k$ it also strikes the arm $l^4$, projecting from tooth $l$, and turns the escapement-pawl back on its pivot, lifting the tooth $l$ out of engagement with the rack D and carrying the rear projection of the escapement-pawl down under the spring-catch O and engaging tooth $l'$ with the rack. The cam $e$ is so adjusted with reference to the sliding bar $a$ that when the key is fully depressed the sliding bar reaches the top of the cam $e$ and the spring $a^4$ throws the sliding bar $a$ back to its first relative position on bar A, carrying the projections $a^5$ out from under the racks. When the key is released from pressure, the key-lever drops and the rocking frame descends, with the cam $a^3$ of the sliding bar $a$, outside of the pendent cam $e$ until it reaches the bottom of its descent, when the spring $e'$ throws the cam $e$ back to the position of starting, as shown in Fig. 8. As soon as the projection $a^5$ is moved from contact with the rack D and the tooth $l$ is disengaged the rack descends nine notches and the stop-pin $d$ strikes the top of the graduated arm H, whose pin $h'$ is now in engagement again with the bottom notch of the ratchet-bar $k$. During the descent of the rack D the pinion $g$ and disk G are rotated and bring the figure "9" on the disk to the former position of the zero. The striking of the bell and the opening of the drawer are simultaneous, followed immediately by the release of the rack and forward movement of the indicator. When the rocking frame descends, the cam $a^7$ bears down again on the horizontal arm $p^6$, turning the bell-crank $p^3 p^6$ on its fulcrum and returning the blind so that the reading-opening exposes the figure "9" to view. During this operation the indicators and registering-wheels of the dimes and dollars sets have remained at zero and their racks are still at full height; but the rack of the cents set has descended its full limit. If now No. 1 of the cents-keys be operated, as soon as the sliding bar N begins to move, as in the operation of key No. 9, just described, it will throw tooth $l'$ out of engagement with the rack D and throw tooth $l$ into engagement. The projection $a^5$ will again come in line with the rack-bar D and come in contact with it, as shown in Fig. 18, which shows the operation of key No. 1 after the operation of No. 9, the rack being partially raised and the blind moved. Although Fig. 18 represents the dimes set during the operation of its No. 1 key succeeding its No. 9 key, it illustrates equally well the position of the several parts of the cents set under the conditions now being described. Upon full depression of the key the rack will be again raised to full height, the indicator-disk will be turned back to zero, and the graduated arm will be carried up for the pin $h'$ to engage with the highest notch of the ratchet-bar $k$, so that when the rack descends it can drop but one notch, turning the indicator forward to "1." As previously stated, the ratchet-bar has nine teeth for the nine keys and the pinion has ten teeth for the ten divisions of the disk. During the upward movement of the rack the pinion turns back nine notches and causes the registering-wheel to register "9" for the last preceding key operated. The remainder of the operation of this key is similar to that already described. At the next operation of any one of the keys, whether in the cents set or in either of the other sets, the rack will again be raised to its full height, and the "1" just indicated will be registered, the "9" and the "1" combined making "10," which will be transferred to the dimes-registering wheel.

The successive steps in the operation of a dimes-key or a dollars-key will be the same as for the cents-key, except that the registration takes place immediately instead of waiting for operation of another key.

What I claim as my invention is—

1. In a cash indicator and registerer, the combination of a series of key-levers turning upon a fulcrum-rod, a rocking frame raised by the depression of any one of the keys, a detent by which the rocking frame is prevented from retrograde movement after the partial operation of a key until the rocking frame has completed its whole upward stroke, the key-levers all being free on their fulcrum during the entire movement, whereby the upward stroke may be completed by the continued operation of the same key or by any other key, and means for releasing the detent from engagement with the rocking frame upon completion of its upward movement, substantially as described.

2. In a cash indicator and register, the combination of a series of key-levers turning upon a fulcrum-rod, a rocking frame raised by depression of any one of the keys, a detent by which the rocking frame is prevented from retrograde movement after the partial operation of a key until the rocking frame has completed its full upward movement, the key-levers all being free on their fulcrum during the entire movement, whereby the upward stroke may be completed by the continued operation of the same key or by any other key, and means for releasing the detent from engagement with the rocking frame upon completion of its upward movement, the indication and registration being governed by the last operated key only, substantially as described.

3. In a cash indicator and register, the combination of a series of key-levers turning upon a fulcrum-rod, a rocking frame raised by the depression of any one of the keys, a pendent ratchet-bar which prevents retrograde movement of the rocking frame after the partial operation of a key until the rocking frame has completed its full upward movement, the key-levers all being free on their fulcrum during the entire movement, whereby the upward stroke may be completed by the continued operation of the same key or by any other key, and means for releasing the pendent ratchet from engagement when the full upward movement of the rocking frame is completed, the indication and registration being governed by the last operated key only, substantially as described.

4. In a cash indicator and register, the combination of a series of key-levers turning on a fulcrum-rod, a rocking frame raised by the depression of any one of the keys, a sliding bar on said rocking frame, which is reciprocated by a pendent cam on the upward movement of the rocking frame, a pendent ratchet-bar which engages with the sliding bar and prevents retrograde movement of the rocking frame until the full upward movement of the rocking frame is completed, and means for releasing the sliding bar from engagement with the ratchet-bar when the full upward movement is completed and allowing the rocking frame to descend, substantially as described.

5. In a cash indicator and register, the combination of a series of key-levers turning upon a fulcrum-rod, a rocking frame raised by the depression of any one of the keys, a vertically-reciprocating rack-bar raised by the rocking frame, said rack-bar engaging with a pinion on a shaft carrying an indicator-disk, the rack-bar being so adjusted that the full depression of any key will raise the rack-bar to its full upward stroke and turn the dial back to zero, and means by which when the key is released the rack is allowed to descend a distance varying according to the key being operated, the pinion and disk rotating forward through an arc varying according to the descent of the rack and exposing the number to be indicated, substantially as described.

6. In a cash indicator and register, a series of key-levers turning on a fulcrum-rod, a rocking frame raised by the depression of any one of the keys, a vertically-reciprocating rack-bar raised by the rocking frame, said rack-bar engaging with a pinion on a shaft carrying an indicator-disk, the rack-bar being so adjusted that the full depression of any one of the keys will raise the rack-bar its full upward stroke and turn the dial back to zero, a graduated arm which is also raised by the key-lever, a ratchet-bar with which the graduated arm engages when the key is released after a full depression of the key, and a stop which checks the descent of the rack-bar at a point according to the key being operated, the pinion and indicator rotating forward through an arc varying according to the number of the key operated, substantially as described.

7. In a cash indicator and register, a series of key-levers turning on a fulcrum-rod, a rocking frame raised by the depression of any one of the keys, a vertically-reciprocating rack-bar raised by the rocking frame, said rack-bar engaging with a pinion on a shaft carrying an indicator-disk, the rack-bar being so adjusted that the full depression of a key will raise the rack-bar its full upward stroke and turn the dial backward to zero, an escapement-pawl which engages with the rack-bar and prevents its descent until its full upward stroke is completed and which prevents any upward movement again after the descent has begun until the next key is operated, a graduated arm which is also raised by the key-lever, a ratchet-bar with which the graduated arm engages when the key is released after a full depression of the key, and a stop which limits the descent of the rack-bar according to the key being operated, the pinion and indicator rotating forward through an arc varying according to the number of the key operated, substantially as described.

8. In a cash indicator and register, the combination of a series of key-levers turning on a fulcrum-rod, a rocking frame raised by the depression of any one of the keys, a detent by which the rocking frame is prevented from retrograde movement after the partial operation of a key until the full upward movement of the rocking frame is completed, which completion may be accomplished by the further depression of the same key by which the stroke was begun or by the depression of any other key in the series, the registration being governed by the last-operated key, a vertically-reciprocating rack-bar raised by the rocking frame, said rack-bar engaging with a pinion on a shaft carrying an indicator-disk, the rack-bar being so adjusted that the full depression of any key will raise the rack-bar to its full upward stroke and turn the disk back to zero; means by which when the key is released the rack is allowed to descend a distance proportional to the number indicated by the key being operated, and a detent for holding the rack at that point, the indicator-disk rotating forward through an arc varying according to the descent of the rack, substantially as described.

9. In a cash indicator and register, the combination of a series of key-levers turning on a fulcrum-rod, a rocking frame raised by the depression of any one of the keys, a pendent ratchet-bar which prevents the retrograde movement of the rocking frame after the partial operation of a key until the full upward movement of the rocking frame is completed, which completion may be accomplished either by the further depression of the same key by which the operation was begun or by depression of any other key in the series, the registration being governed by the last-operated key, a vertically-reciprocating rack-bar raised by the rocking frame, said rack-bar engaging with a pinion on a shaft carrying an indicator-disk, the rack-bar being so adjusted that the full depression of any key will raise the rack-bar its full upward stroke and turn the indicator-disk back to zero, means by which when the key is released the rack is allowed to descend a distance proportional to the number indicated by the key being operated, and a detent for holding the rack at that point, the indicator-disk rotating forward through an arc varying according to the descent of the rack, substantially as described.

10. In a cash indicator and register, the combination of a series of key-levers turning on a fulcrum-rod, a rocking frame raised by the depression of any one of the keys, a sliding bar on said rocking frame which is reciprocated by a pendent cam on the upward movement of the rocking frame, a pendent ratchet-bar which engages with the sliding bar and prevents retrograde movement of the rocking frame until the full upward movement of the rocking frame is completed, and means for releasing the sliding bar from engagement with the ratchet-bar when the full upward movement is completed and allowing the rocking frame to descend, a vertically-reciprocating rack-bar raised by a projection on the sliding bar, said rack-bar engaging with a pinion on a shaft carrying an indicator-disk, the rack-bar being so adjusted that the full depression of any key will raise the rack-bar its full upward stroke and turn the indicator-disk back to zero, and means by which when the key is fully depressed the projection on the sliding bar is removed from beneath the rack and the rack is allowed to descend a distance proportional to the number indicated by the key being operated, the indicator-disk rotating forward through an arc varying according to the descent of the rack, substantially as described.

11. In a cash indicator and register, the combination of a series of key-levers turning on a fulcrum-rod, a rocking frame raised by the depression of any one of the keys, a pendent ratchet-bar which prevents the retrograde movement of the rocking frame after the partial operation of a key until the full upward movement of the rocking frame is completed, which completion may be accomplished either by the further depression of the same key by which the operation was begun or by depression of any other key in the series, the registration being governed by the last-operated key, a vertically-reciprocating rack-bar raised by the rocking frame, said rack-bar engaging with a pinion on a shaft carrying an indicator-disk, the rack-bar being so adjusted that the full depression of any key will raise the rack-bar its full upward stroke and turn the dial back to zero, a graduated arm which is also raised by the key-lever, a ratchet-bar with which the graduated arm engages when the key is released after a full depression of the key, and a stop which checks the descent of the rack-bar when the rack-bar descends at a point according to the key being operated, the indicator rotating forward through an arc varying according to the descent of the rack, substantially as described.

12. In a cash indicator and register, the combination of a series of key-levers turning on a fulcrum-rod, a rocking frame raised by the depression of any one of the keys, a sliding bar on said rocking frame which is reciprocated by a pendent cam on the upward movement of the rocking frame, a pendent ratchet-bar which engages with the sliding bar and prevents retrograde movement of the rocking frame until the full upward movement of the rocking frame is completed, and means for releasing the sliding bar from engagement with the ratchet-bar when the full upward movement is completed and allowing the rocking frame to descend, a vertically-reciprocating rack-bar raised by a projection on the sliding bar, said rack-bar engaging with a pinion on a shaft carrying an indicator-disk, the rack-bar being so adjusted that the full depression of any key will raise the rack-bar its full upward stroke and turn the indicator-disk back to zero, and means by which when the key is released the rack is allowed to descend a distance proportional to the number indicated by the key being operated, the indicator-disk rotating forward through an arc varying according to the descent of the rack, substantially as described.

13. In a cash indicator and register, the combination of a series of key-levers, a rack raised to the full upward limit of its stroke upon depression of any one of the keys, and a shaft carrying an indicator-disk and geared to engage with the rack, so that the disk turns back to the zero position when the rack rises, the rack descending after full depression of a key a distance varying according to the number of the key operated and rotating the disk forward a corresponding distance, substantially as described.

14. In a cash indicator and register, a series of key-levers, a rocking frame raised by depression of any one of the keys, a sliding bar connected with the rocking frame, a rack-bar lifted to its full upward stroke by the sliding bar upon depression of any key, and a shaft carrying an indicator-disk, said rack-bar being geared to the shaft, so that the indicator-disk turns back to the zero position upon depression of any key, the rack then descending and the indicator-disk rotating forward a distance varying with the key operated, substantially as described.

15. In a cash indicator and register, the combination of a series of key-levers turning on a fulcrum-rod, a rocking frame raised by depression of one of the keys, a sliding bar on said rocking frame reciprocated by a pendent cam on the upward movement of the rocking frame, a pendent ratchet-bar which engages with the sliding bar and prevents retrograde movement of the rocking frame until the full upward movement is completed, a vertically-reciprocating rack-bar raised by a projection on the sliding bar, said rack-bar engaging with a pinion on a shaft carrying an indicator-disk, and means for releasing the sliding bar when the full upward movement is completed and throwing the projection on the bar out of line with the rack, substantially as described.

16. In a cash indicator and register, the combination of a series of key-levers turning on a fulcrum-rod, a rocking frame raised by the depression of any one of the keys, a pendent ratchet-bar which prevents the retrograde movement of the rocking frame after the partial operation of a key until the full upward movement of the rocking frame is completed, which completion may be accomplished either by the further depression of the same key by which the operation was begun or by depression of any other key in the series, the registration being governed by the last-operated key, a vertically-reciprocating rack-bar raised by the rocking frame, said rack-bar engaging with a pinion on a shaft carrying an indicator-disk, the rack-bar being so adjusted that the full depression of any key will raise the rack-bar its full upward stroke and turn the dial back to zero, an escapement-pawl which engages with the rack-bar and prevents its descent until the full upward stroke is completed and which prevents any upward movement again after the descent has begun until a new operation, a graduated arm which is also raised by the key-lever, a ratchet-bar with which the graduated arm engages when the key is released after full depression of the key, and a stop which limits the descent of the rack-bar according to the key being operated, the indicator rotating forward through an arc varying according to the number of the key operated, substantially as described.

17. In a cash indicator and register, the combination of a series of key-levers turning on a fulcrum-rod, a rocking frame raised by the depression of any one of the keys, a sliding bar on said rocking frame, which is reciprocated by a pendent cam on the upward movement of the rocking frame, a pendent ratchet-bar which engages with the sliding bar and prevents the retrograde movement of the rocking frame until the full upward movement of the rocking frame is completed, and means for releasing the sliding bar from engagement with the ratchet-bar when the full upward movement is completed and allowing the rocking frame to descend, a vertically-reciprocating rack-bar raised by a projection on the sliding bar, said rack-bar engaging with a pinion on a shaft carrying an indicator-disk, the rack-bar being so adjusted that the full depression of any key will raise the rack-bar its full upward stroke and turn the indicator-disk back to zero, an escapement-pawl which engages with the rack-bar and prevents its descent until the full upward stroke is completed and which prevents any upward movement again after the descent has begun until the next key is operated, a graduated arm which is also raised by the key-lever, a ratchet-bar with which the graduated arm engages when the key is released after full depression of the key, and a stop which limits the descent of the rack-bar according to the key operated, the indicator rotating forward through an arc varying according to the number of the key operated, substantially as described.

18. In a cash indicator and register, the combination of a series of key-levers turning on a fulcrum-rod, a rocking frame raised by the depression of any key, a sliding bar on said rocking frame which is reciprocated by a pendent cam on the upward movement of the rocking frame, a pendent ratchet-bar which engages with the sliding bar and prevents retrograde movement of the rocking frame until the full upward movement of the rocking frame is completed, and means for releasing the sliding bar from engagement with the ratchet-bar when the full upward movement is completed and allowing the rocking frame to descend, a vertically-reciprocating rack-bar raised by a projection on the sliding bar, said rack-bar engaging with a pinion on a shaft carrying an indicator-disk and a registering-wheel, the rack-bar being so adjusted that the full depression of any key will raise the rack-bar its full upward stroke and turn the indicator-disk to zero, an escapement-pawl which engages with the rack-bar and prevents its descent until the full upward stroke is completed and which prevents any upward movement again after the descent is begun until the next key is operated, a graduated arm which is also raised by the key-lever, a ratchet-bar with which the graduated arm engages when the key is released, and a stop which limits the descent of the rack-bar according to the key operated, the indicator rotating forward through an arc varying according to the number of the key operated and the registering-wheel being allowed to turn in one direction only and registering the desired amount, substantially as described.

19. In a cash indicator and register, the combination of two or more sets of key-levers turning on a common fulcrum-rod, a rocking frame raised by the depression of any one of the keys in any of the sets, a sliding bar on said rocking frame, which is reciprocated by a pendent cam on the upward movement of the rocking frame, a pendent ratchet-bar which engages with the sliding bar and prevents retrograde movement of the rocking frame until the full upward movement is completed, which completion may be accomplished either by the further depression of the same key by which the operation was begun or by depression of any other key in any of the sets, the registration being govered by the last-operated key only, a vertically-reciprocating rack-bar for each set of keys, the racks in all the sets being raised by projections on the sliding bar upon operation of any key, each rack-bar engaging with a pinion on a shaft carrying an indicator-disk and a registering-wheel, the rack-bars being so adjusted that the full depression of any key will raise all the rack-bars the full upward stroke and turn the indicator-disks to zero, an escapement-pawl which engages with each rack-bar and prevents its descent until the full upward stroke is completed and which prevents any upward movement again after the descent is begun until a new operation of a key, a graduated arm for each set, the one in the set to which the operated key belongs being also raised by said key, a ratchet-bar with which the graduated arm engages, a tripping device which disengages the graduated arm and re-engages it at a point corresponding with the key operated, and a device for tripping the escapement-pawl and allowing the rack belonging to the same set as the operated key to descend, and a stop which limits the descent according to the key operated, the indicator rotating forward through an arc varying according to the number of the key operated, the registering-wheel being allowed to turn in one direction only and registering the desired amount, the racks in the unoperated sets being all held at their raised position and with their disks remaining at zero until a key in that set is operated, substantially as described.

20. In a cash indicator and register, the combination of a series of key-levers turning on a fulcrum-rod, a rocking frame raised by the depression of any one of the keys, a sliding bar on said rocking frame reciprocated by a pendent cam on the upward movement of the rocking frame, a pendent ratchet-bar which engages with the sliding bar and prevents retrograde movement of the rocking frame until the full upward movement of the rocking frame is completed, a spring which reciprocates the sliding bar in the reverse direction upon completion of the upward stroke and brings the cam projection on the sliding-bar on the reverse side of the pendent cam, disengaging the sliding bar from the pendent ratchet-bar and allowing the rocking frame to descend, a vertically-reciprocating rack-bar raised by projections on the sliding bar, said rack-bar engaging with a pinion on a shaft carrying an indicator-disk, the rack-bar being so adjusted that the full depression of a key will raise the rack to its full upward stroke and turn the disk back to zero, an escapement-pawl which engages with the rack-bar and prevents its descent until its full upward stroke is completed, this engagement being effected by means of a spring-catch at the heel of the escapement-pawl and a slotted sliding bar, through the slot of which projects a pin on the escapement-pawl, this slotted sliding bar being reciprocated so as to act upon the said pin and engage the upper tooth of the escapement-pawl with the rack on its upward movement, the reciprocation of said slotted sliding bar being effected by means of the sliding bar on the rocking frame operating through the pendent ratchet-lever connected therewith and a reverse pendent lever between the ratchet-lever and the slotted sliding bar, a spring which reciprocates the slotted sliding bar in the reverse direction when the upward movement of the rocking frame is completed, an arm projecting from the upper tooth of the escapement-pawl toward the rear, a swinging bar acted upon by the key-lever at the latter part of its upward stroke to strike the said projecting arm on the pawl and disengage the upper tooth from the rack, allowing the descent and preventing the ascent of the rack, a graduated arm which is also raised by the key-lever, a ratchet-bar with which a pin on the graduated arm engages when the key is released after a full depression of the key, and a stop which limits the descent of the rack-bar according to the key being operated, the pinion and indicator rotating forward through an arc varying according to the number of the key operated, substantially as described.

21. In a cash indicator and register, the combination of a series of key-levers turning on a fulcrum-rod, a rocking frame raised by the depression of one of the keys, a graduated arm raised by the key-lever, a ratchet-bar with which the graduated arm engages, a swinging bar raised by the key-lever and having a tripping device which disengages the ratchet-bar from the graduated arm and holds it in position for re-engagement at a point graduated according to the key operated, substantially as described.

22. In a cash indicator and register, the combination of an indicator-disk and a registering-wheel on the same shaft, the indicator-disk being fixed to the shaft and rotating in either direction with it, the registering-wheel being loose on the shaft, a series of key-levers, and mechanism by which upon the operation of any key the disk is automatically turned to zero position and then rotates in the reverse direction through an arc varying with the key operated, substantially as described.

23. In a cash indicator and register, the combination of an indicator-disk and a registering-wheel on the same shaft, the indicator-disk being fixed to the shaft and rotating in either direction with it, the registering-wheel being loose on the shaft, a series of key-levers, and mechanism by which the operation of a key-lever causes the shaft to rotate in one direction and then in the reverse direction, the first rotation causing the indicator-disk to turn to zero and the second rotation causing it to indicate the number of the key operated, a detent which prevents the registering-wheel from rotating in but one direction, and a ratchet-and-pawl device which causes the registering-wheel to rotate during one of the movements of the shaft and register the desired amount, substantially as described.

24. In a cash indicator and register, a series of key-levers, a rotating indicator-disk with numbers graduated according to the number of keys, mechanism by which the operation of a key causes the disk to rotate and expose the number corresponding to the key operated, a sliding blind with a reading-opening, through which the number indicated by the disk may be read at the end of the operation, and mechanism for causing the blind to slide and carry the reading-opening out of line with the numbers on the disk until completion of the operation, substantially as described.

25. In a cash indicator and register, a series of key-levers turning on a fulcrum-rod, a rocking frame raised by the operation of one of the keys, a rotating indicator-disk with numbers graduated according to the number of the keys in the series, mechanism by which the operation of a key causes the disk to rotate and expose the number corresponding to the key operated, a sliding blind with an opening, through which the number is exposed at the conclusion of the operation of a key, a pivoted bell-crank lever with the end of one arm pivoted to the end of the blind-slide, the other arm of the bell-crank lever extending under the rocking frame, and means by which when the rocking frame is raised the said bell-crank lever is turned on its fulcrum and slides the blind, so that the reading-opening is out of alignment with the number during rotation of the disk and returns the blind to expose the proper number through the reading-opening at the conclusion of the rotation, substantially as described.

26. In a cash indicator and register, a series of key-levers turning on a fulcrum-rod, a rocking frame raised by the operation of one of the keys, a rotating indicator-disk with numbers graduated according to the number of keys in the series, mechanism by which the operation of a key causes the disk to rotate and expose the number corresponding to the key operated, a sliding blind with a reading-opening, a pivoted bell-crank lever with the end of one arm pivoted to the end of the blind-slide, the other arm extending under the rocking frame, and a cam on the rocking frame, which engages with the lever as the rocking frame rises, turning the lever on its fulcrum and sliding the blind and bringing the reading-opening out of alignment with the numbers on the disk, the downward movement of the rocking frame returning the blind, substantially as described.

27. In a cash indicator and register, a series of key-levers turning on a fulcrum-rod, a rocking frame raised by the operation of one of the keys, a rotating indicator-disk with numbers graduated according to the number of keys in the set, mechanism by which the operation of a key causes the disk to rotate and expose the number corresponding to the key operated, a sliding blind with a reading-opening, a pivoted bell-crank lever with the end of one arm pivoted to the end of the blind-slide, the other arm extending under the rocking frame, and a spring which turns the bell-crank on its fulcrum and slides the blind, bringing the reading-opening out of alignment with the numbers on the disk as the rocking frame rises, the downward movement of the rocking frame returning the blind, substantially as described.

28. In a cash indicator and register, a series of key-levers turning on a fulcrum-rod, a rocking frame raised by the operation of one of the keys, a sliding bar on said rocking frame, which is reciprocated by a pendent cam on the upward movement of the rocking frame, a pendent ratchet-bar which engages with the sliding bar and prevents the retrograde movement of the rocking frame until the full upward movement of the rocking frame is completed, and means for releasing the sliding bar from engagement with the ratchet-bar when the full upward movement is completed, a vertically-reciprocating rack-bar raised by a projection on the sliding bar, said rack-bar engaging with a pinion on a shaft carrying an indicator-disk, the rack-bar being so adjusted that the full depression of any key will raise the rack-bar its full upward stroke and turn the indicator back to zero, an escapement-pawl which engages with the rack-bar and prevents its descent until the full upward stroke is completed and which prevents any upward movement again after the descent is begun until a key is again operated, a graduated arm which is also raised by the key-lever, a ratchet-bar with which the graduated arm engages when the key is released after full depression of the key, a stop which limits the descent of the rack-bar, according to the key operated, the indicator rotating forward through an arc varying according to the number of the key operated, a sliding blind with an opening, through which the number on the disk is exposed at the conclusion of the operation of a key, a bell-crank lever, with the end of one arm pivoted to the end of the blind-slide, the other arm of the bell-crank extending under the rocking frame, a device which when the rocking frame is being raised turns the bell-crank on its fulcrum and slides the blind to carry the reading-opening out of alignment with the numbers on the indicator while the disk is rotating, and a device which turns the lever in the reverse direction on its fulcrum and returns the blind to expose the proper number through the reading-opening at the conclusion of the operation, substantially as described.

29. In a cash indicator and register, a series of keys numbered to indicate different amounts, a registering-wheel and a carrying-wheel normally in gear and connected with the keys by intermediate mechanism, so as to register the number of the key operated in addition to the amount previously registered on said wheels, the carrying-wheel being fixed on a shaft which is adapted to move axially in its bearings, a finger-piece on said shaft, whereby the said shaft may be pushed inwardly, throwing the carrying-wheel out of gear with the registering-wheel and whereby the carrying-wheel may be rotated freely in either direction and set at zero, the registering-wheel being adapted to be set at zero by operation of a key, and a spring acting upon said carrying-wheel to return it into gear with the registering-wheel when the finger is removed, substantially as described.

30. In a cash indicator and register, a series of keys numbered to indicate different amounts, a registering-wheel and a train of carrying-wheels normally in gear with the registering-wheel and connected with the keys by intermediate mechanism, so as to register the number of the key operated in addition to the amount previously registered, the first carrying-wheel being fixed on a shaft which is adapted to move axially in its bearings, a finger-piece on said shaft, whereby the said shaft may be pushed inwardly, throwing the carrying-wheels out of gear with the registering-wheel and leaving them in gear with each other, whereby the carrying-wheels may be rotated freely in either direction and all set at zero, the registering-wheel being adapted to be set at zero by operation of a key, and a spring acting upon the first carrying-wheel to return all the carrying-wheels into gear with the registering-wheel when the finger is removed, substantially as described.

31. In a cash indicator and register, the combination of a series of key-levers turning on a fulcrum-rod, a rocking frame raised by the depression of any one of the keys, a vertically-reciprocating rack-bar raised by the rocking frame, said rack-bar engaging with a pinion on a shaft carrying an indicator-disk, the rack-bar being so adjusted that the full depression of any one of the keys will raise the rack-bar its full upward stroke and turn the disk back to zero, a graduated arm which is also raised by the key-lever, a ratchet-bar with which the graduated arm engages when the key is released after a full depression of the key, and a stop which checks the descent of the rack-bar at a point according to the key operated, the indicator rotating forward through an arc varying according to the number of the key operated, and an additional key-lever which when operated raises the rocking frame and the rack-bar to their full upward limit, turning the indicator-disks in the series all back to zero, but without changing the engagement of the graduated arm with the ratchet-bar, and a detent which holds the rack-bar at its elevated position with the disks, all remaining at zero after the return of the key, substantially as described.

32. In a cash indicator and register, the combination of two or more sets of key-levers turning on a common fulcrum-rod, a rocking frame raised by the depression of any one of the keys in any of the sets, a detent by which the rocking frame is prevented from retrograde movement after the partial operation of a key until the full upward movement is completed, which completion may be accomplished either by the further depression of the same key by which the operation was begun or by depression of any other key in any of the series, the registration being governed by the last-operated key only, a vertically-reciprocating rack-bar for each set of keys, the rack-bar in each set being raised by the operation of any one of the keys in any one of the sets, each rack-bar engaging with a pinion on a shaft carrying an indicator-disk, the rack-bars being so adjusted that the full depression of any one of the keys will raise all the rack-bars to their full upward limit and turn the disks all back to zero, means by which when the key is released the rack belonging to that set will descend a distance proportional to the number indicated by the key being operated, and a detent for holding the rack at that point, the indicator rotating forward through an arc varying according to the descent of the rack and exposing the number to be indicated, and a detent for holding the racks in the other sets at their elevated position without registering and with the disks remaining at zero until a key in that set is operated, substantially as described.

33. In a cash indicator and register, the combination of two or more sets of key-levers turning on a common fulcrum-rod, a rocking frame raised by the depression of any of the keys in any of the sets, a detent by which the rocking frame is prevented from retrograde movement after the partial operation of a key until the full upward movement is completed, which completion may be accomplished by the further depression of the same key with which the operation was begun or by depression of any other key in any of the sets or by simultaneous operation of a key in each of the sets, a vertically-reciprocating rack-bar for each set of keys, the rack-bar in each set being raised by the operation of any one of the keys in any of the sets or by simultaneous operation of a key in each set, each rack-bar engaging with a pinion on a shaft carrying an indicator-disk, the rack-bars being so adjusted that the full depression of the keys operated will raise all the rack-bars to their full upward limit and turn the disks all back to zero, means by which when the keys are released the racks belonging to the same set as those keys will each descend a distance proportional to the number indicated by its respective key, and a detent for holding the rack at that point, the indicator-disks rotating forward through an arc corresponding to the descent of the respective racks and each exposing the number corresponding to the key which has been operated in that set, substantially as described.

34. In a cash indicator and register, the combination of a series of key-levers turning on a fulcrum-rod, a rocking frame raised by the depression of any one of the keys, a sliding bar on said rocking frame, which is reciprocated by a pendent cam on the upward movement of the rocking frame, a pendent ratchet-bar fixed on a shaft and engaging with the sliding bar to prevent retrograde movement of the rocking frame until the full upward movement of the rocking frame is completed, a bell, a bell-hammer connected with the shaft of the said pendent ratchet-bar and vibrating with the ratchet-bar, a spring connected with the pendent ratchet-bar, which allows it to yield to the thrust of the sliding bar and partially turn the shaft, the spring throwing the ratchet-bar back to engage its notches with the sliding bar, the upper notch allowing a greater throw than the lower notches and causing the hammer to strike the bell, a vertically-reciprocating rack-bar raised by projections on the sliding bar, said rack-bar engaging with a pinion on a shaft carrying an indicator-disk, and a registering-wheel carried on the same shaft as the indicator-disk, all co-operating so that a single stroke operates the indicator-disk, the registering-wheel, and the bell, substantially as described.

35. In a cash indicator and register, the combination of a series of key-levers turning on a fulcrum-rod, a rocking frame raised by the depression of any one of the keys, a sliding bar on said rocking frame, which is reciprocated by a pendent cam on the upward movement of the rocking frame, a pendent ratchet-bar fixed on a shaft and engaging with the sliding bar to prevent retrograde movement of the rocking frame until completion of the upward movement, a bell, a bell-hammer connected with the shaft of the said ratchet-bar, which allows it to yield to the thrust of the sliding bar and partially turn the shaft, the spring throwing the ratchet-bar back to engage its notches with the sliding bar, the upper notch being of such depth as to allow a greater throw than the lower notches and cause the hammer to strike the bell, a vertically-reciprocating rack-bar raised by a projection on the sliding bar, said rack-bar engaging with a pinion on a shaft carrying an indicator-disk, the rack-bar being so adjusted that the full depression of any key will raise the rack-bar its full upward movement and turn the indicator-disk back to zero, an escapement-pawl which engages with the rack-bar and prevents its descent until the full upward movement is completed and which prevents any upward movement again after the descent has begun until the next key is operated, a ratchet-bar with which the graduated arm engages when the key is released after full depression of the key, and a stop which limits the descent of the rack-bar, according to the key operated, the indicator rotating forward through an arc varying according to the number of the key operated, and a registering-wheel carried on the same shaft as the indicator-disk, all co-operating so that a single stroke operates the indicator, the registering-wheel, and the bell, substantially as as described.

36. In a cash indicator and register, the combination of a series of key-levers, a rocking frame extending crosswise above the key-levers and raised by the depression of any one of the keys, a drawer, a bell-crank lever having one arm with a bolt pivoted thereto, which engages with the drawer, the other arm extending upward in front of the rocking frame, the rocking frame bearing directly on the upright arm of the bell-crank and sweeping forward in its upward movement, carrying forward the upright arm of the bell-crank, turning it on its fulcrum and lifting the bolt, and a spring which is connected with the drawer and under tension when the drawer is closed and throws open the drawer when the bolt is withdrawn, substantially as described.

37. In a cash indicator and register, the combination of a series of key-levers, a rocking frame extending crosswise above the key-levers and raised by depression of any one of the keys, a drawer, a bell-crank lever having one arm with a bolt pivoted thereto, which engages with the drawer, the other arm extending upward in front of the rocking frame, which engages with it and turns it on its fulcrum, lifting the bolt when a key is operated, a catch at the rear of the drawer with which the bolt engages, a shaft, a coiled spring connected with the shaft, and mechanism by which the closing of the drawer turns the shaft and winds the spring, the whole adapted so that upon depression of a key the bolt is withdrawn and the spring throws open the drawer, substantially as described.

38. In a cash indicator and register, the combination of a series of key-levers, a rocking frame extending crosswise above the key-levers and raised by depression of any one of the keys, a drawer, a bell-crank lever with one arm engaged by the rocking frame and turned on its fulcrum when a key is operated, the other arm having a bolt pivoted thereto, which locks the drawer, a shaft having a spring coiled thereon, and a chain connected with said shaft and with the drawer, whereby the act of closing the drawer rotates the shaft and winds the spring, the whole combined so that upon depression of a key the bolt is withdrawn and the drawer thrown open by the spring, substantially as described.

39. In a cash indicator and register, the combination of a series of key-levers turning upon a fulcrum-rod, a rocking frame raised by the depression of any one of the keys, a detent by which the rocking frame is prevented from retrograde movement after the partial operation of a key until the full upward movement is completed, which completion may be accomplished either by the further depression of the same key by which the operation was begun or by any other key in the series, the registration being governed by the last key operated, a vertically-reciprocating rack-bar raised by the rocking frame, said rack-bar engaging with a pinion on a shaft carrying an indicator-disk, the rack-bar being so adjusted that the full depression of any key will raise the rack-bar to its full upward movement and turn the indicator-disk back to zero, means by which when the key is released the rack is allowed to descend a distance varying according to the number of the key operated, turning the disk to indicate the corresponding number, a drawer, a bell-crank lever fulcrumed above the drawer, with the upright arm extending upward in front of the cross-bar, the other arm having a bolt pivoted thereto, a catch at the rear of the drawer with which the bolt engages, and a spring which is wound up by the closing of the drawer, the whole adapted so that depression of a key raises the cross-bar and turns the bell-crank, withdrawing the bolt, the spring throwing open the drawer, substantially as described.

WILL R. JOHNS.

Witnesses:
 WM. H. WHITE,
 FREDK. J. RAULETT.